(12) United States Patent
Doui

(10) Patent No.: US 8,639,761 B2
(45) Date of Patent: Jan. 28, 2014

(54) DATA PROCESSING SYSTEM SUITED FOR TRANSMITTING AND RECEIVING DATA AMONG PLURALITY OF IMAGE PROCESSING APPARATUSES CONNECTED TO NETWORK, DATA PROCESSING METHOD, AND DATA PROCESSING PROGRAM PRODUCT

(75) Inventor: Takayuki Doui, Kawanishi (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 902 days.

(21) Appl. No.: 11/586,673

(22) Filed: Oct. 26, 2006

(65) Prior Publication Data

US 2007/0253018 A1 Nov. 1, 2007

(30) Foreign Application Priority Data

Apr. 29, 2006 (JP) ................................. 2006-127136

(51) Int. Cl.
*G06F 15/16* (2006.01)
*H04N 1/21* (2006.01)
*H04N 1/00* (2006.01)
*G03F 3/08* (2006.01)
*G06Q 10/10* (2012.01)

(52) U.S. Cl.
CPC .................................. *G06Q 10/107* (2013.01)
USPC ........... 709/206; 709/204; 709/205; 358/296; 358/434; 358/518

(58) Field of Classification Search
USPC ........... 709/204, 205, 206; 358/296, 434, 518
See application file for complete search history.

(56) References Cited

U.S. PATENT DOCUMENTS

| | | | |
|---|---|---|---|
| 5,506,945 A * | 4/1996 | Coutand | ...................... 358/1.15 |
| 6,496,573 B1 | 12/2002 | Ichimura | |
| 6,559,979 B1 | 5/2003 | Ryan | |
| 6,672,213 B2 | 1/2004 | Sugimoto | |
| 6,687,742 B1 | 2/2004 | Iwazaki | |
| 7,019,852 B2 | 3/2006 | Morikawa | |
| 2005/0060564 A1 * | 3/2005 | Murakami et al. | ............ 713/200 |

(Continued)

FOREIGN PATENT DOCUMENTS

| | | |
|---|---|---|
| JP | 11-143802 | 5/1999 |
| JP | 2003-050684 | 2/2003 |

(Continued)

OTHER PUBLICATIONS

Japanese Notice of Ground of Rejection mailed Mar. 18, 2008, directed at counterpart JP application No. 2006-127136; 3 pages.

*Primary Examiner* — Peter Shaw
(74) *Attorney, Agent, or Firm* — Morrison & Foerster LLP

(57) ABSTRACT

MFP accepts designation of user identification information as a destination of data, accepts designation of data to be delivered to the destination, accepts a transmission source process procedure that defines a plurality of processes to be executed on the designated data, and generates related data having them related to each other. In addition, when an input of user identification information is accepted, MFP obtains a transmission destination process procedure registered beforehand corresponding to the input user identification information, decides a final process procedure based on the transmission source process procedure related to the obtained data by the related data and the obtained transmission destination process procedure, and processes the data according to the decided final process procedure.

22 Claims, 26 Drawing Sheets

(56) References Cited

U.S. PATENT DOCUMENTS

| | | | |
|---|---|---|---|
| 2005/0289126 A1* | 12/2005 | Koguchi | 707/3 |
| 2006/0037055 A1* | 2/2006 | Hashimoto et al. | 725/86 |
| 2006/0082802 A1 | 4/2006 | Furuya | |
| 2006/0274360 A1* | 12/2006 | Fukui et al. | 358/1.15 |
| 2007/0006280 A1* | 1/2007 | Takahashi | 726/1 |
| 2007/0047567 A1* | 3/2007 | Suzuki | 370/420 |

FOREIGN PATENT DOCUMENTS

| | | |
|---|---|---|
| JP | 2004-274499 | 9/2004 |
| JP | 2004-342038 | 12/2004 |
| JP | 2005-304053 | 10/2005 |
| JP | 2006-033526 | 2/2006 |
| JP | 2006-110861 | 4/2006 |

* cited by examiner

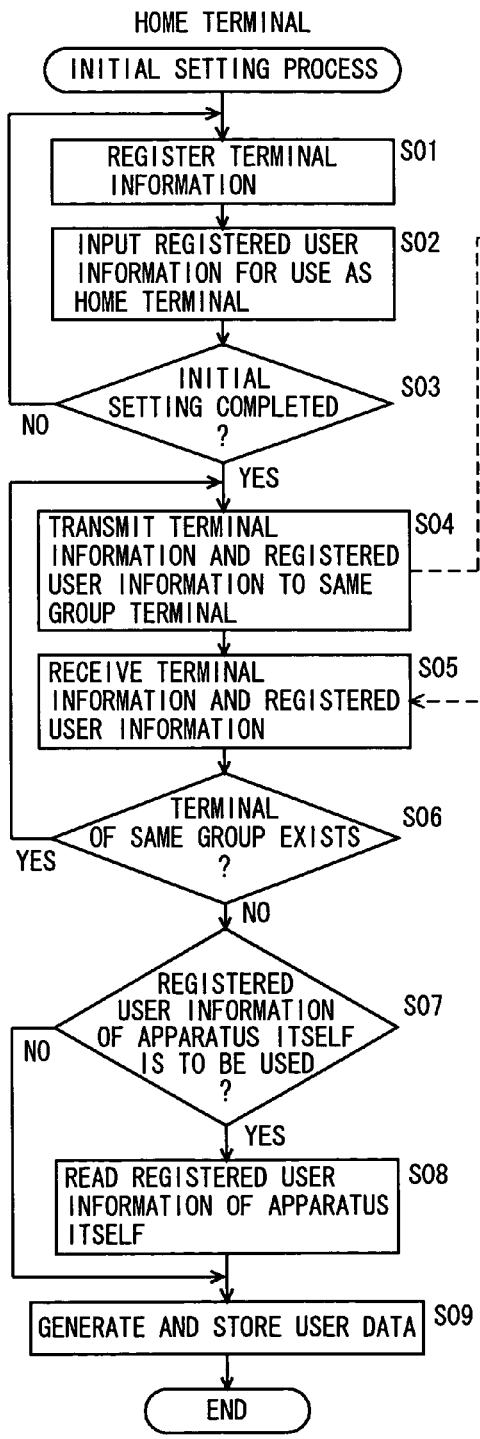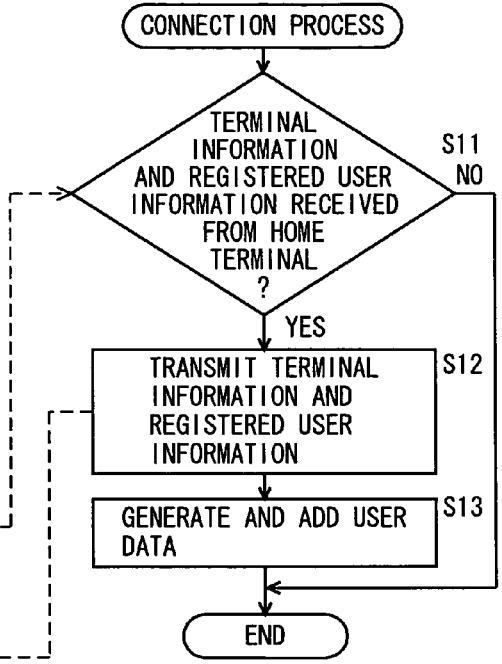
FIG. 3A / FIG. 3B

FIG. 4A

REGISTERED USER INFORMATION OF MFP 100

| NUMBER | USER IDENTIFICATION INFORMATION | DIVISION NAME | E-mail ADDRESS | FACE IMAGE | PASSWORD | TRANSMISSION DESTINATION PROCESS PROCEDURE | SECURITY-RELATED PRINTING PROCEDURE |
|---|---|---|---|---|---|---|---|
| 1 | DAVID | SECRETARIAT | david@xxx.jp | david.jpg | xxx | NORMAL PRINTING PROCESS 1 | PRINTING PROCESS 1 |

FIG. 4B

REGISTERED USER INFORMATION OF MFP 100A

| NUMBER | USER IDENTIFICATION INFORMATION | DIVISION NAME | E-mail ADDRESS | FACE IMAGE | PASSWORD | TRANSMISSION DESTINATION PROCESS PROCEDURE | SECURITY-RELATED PRINTING PROCEDURE |
|---|---|---|---|---|---|---|---|
| 2 | JULIE | PLANNING DIVISION | julie@xxx.jp | julie.jpg | xxxx | NORMAL PRINTING PROCESS 2 | PRINTING PROCESS 2 |

F I G. 4C

REGISTERED USER INFORMATION OF MFP 100B

| NUMBER | USER IDENTIFICATION INFORMATION | DIVISION NAME | E-mail ADDRESS | FACE IMAGE | PASSWORD | TRANSMISSION DESTINATION PROCESS PROCEDURE | SECURITY-RELATED PRINTING PROCEDURE |
|---|---|---|---|---|---|---|---|
| 3 | TED | GENERAL AFFAIRS DIVISION | ted@xxx.jp | ted.jpg | xxxxx | NORMAL PRINTING PROCESS 3 | SECURITY-RELATED PRINTING PROCESS 3 |

F I G. 4D

REGISTERED USER INFORMATION OF MFP 100C

| NUMBER | USER IDENTIFICATION INFORMATION | DIVISION NAME | E-mail ADDRESS | FACE IMAGE | PASSWORD | TRANSMISSION DESTINATION PROCESS PROCEDURE | SECURITY-RELATED PRINTING PROCEDURE |
|---|---|---|---|---|---|---|---|
| 4 | MICHAEL | DEVELOPMENT DIVISION | michael@xxx.jp | michael.jpg | xxxxx | NORMAL PRINTING PROCESS 4 | SECURITY-RELATED PRINTING PROCESS 4 |
| 5 | SUSAN | RESEARCH DIVISION | susan@xxx.jp | susan.jpg | xxxxxx | NORMAL PRINTING PROCESS 5 | SECURITY-RELATED PRINTING PROCESS 5 |

F I G. 4 E

FIRST USER DATA OF MFP 100

| NUMBER | USER IDENTIFICATION INFORMATION | DIVISION NAME | E-mail ADDRESS | FACE IMAGE | PASSWORD | HOME TERMINAL | INSTALLATION PLACE OF HOME TERMINAL |
|---|---|---|---|---|---|---|---|
| 1 | DAVID | SECRETARIAT | david@xxx.jp | david.jpg | xxx | IP ADDRESS OF MFP 100 | 19F COPY ROOM |
| 2 | JULIE | PLANNING DIVISION | julie@xxx.jp | julie.jpg | xxxx | IP ADDRESS OF MFP 100A | 5F PLANNING DIVISION |
| 3 | TED | GENERAL AFFAIRS DIVISION | ted@xxx.jp | ted.jpg | xxxxx | IP ADDRESS OF MFP 100B | 4F MEETING ROOM |
| 4 | MICHAEL | DEVELOPMENT DIVISION | michael@xxx.jp | michael.jpg | xxxxx | IP ADDRESS OF MFP 100C | 14F MEETING ROOM |
| 5 | SUSAN | RESEARCH DIVISION | susan@xxx.jp | susan.jpg | xxxxxx | IP ADDRESS OF MFP 100C | 7F LABORATORY |

F I G. 4 F

SECOND USER DATA OF MFP 100

| NUMBER | USER IDENTIFICATION INFORMATION | DIVISION NAME | E-mail ADDRESS | FACE IMAGE | PASSWORD | HOME TERMINAL | INSTALLATION PLACE OF HOME TERMINAL |
|---|---|---|---|---|---|---|---|
| 2 | JULIE | PLANNING DIVISION | julie@xxx.jp | julie.jpg | xxxx | IP ADDRESS OF MFP 100A | 5F PLANNING DIVISION |
| 3 | TED | GENERAL AFFAIRS DIVISION | ted@xxx.jp | ted.jpg | xxxxx | IP ADDRESS OF MFP 100B | 4F MEETING ROOM |
| 4 | MICHAEL | DEVELOPMENT DIVISION | michael@xxx.jp | michael.jpg | xxxxx | IP ADDRESS OF MFP 100C | 14F MEETING ROOM |
| 5 | SUSAN | RESEARCH DIVISION | susan@xxx.jp | susan.jpg | xxxxxx | IP ADDRESS OF MFP 100C | 7F LABORATORY |

F I G. 7

| NORMAL PRINTING PROCESS SETTING [PRIORITY: LEVEL 1 (HIGH) – LEVEL 5 (LOW)] | | | |
|---|---|---|---|
| COLOR PRINTING | Level.1 ▽ | MONOCHROME PRINTING | NO DESIGNATION ▽ |
| TWO-COLOR PRINTING (MAGENTA) | NO DESIGNATION ▽ | TWO-COLOR PRINTING (YELLOW) | NO DESIGNATION ▽ |
| HIGH-RESOLUTION PRINTING | Level.2 ▽ | LOW-RESOLUTION PRINTING | NO DESIGNATION ▽ |
| N-in-1 PRINTING (4 in 1) | NO DESIGNATION ▽ | ENLARGEMENT/REDUCTION PROHIBITED | NO DESIGNATION ▽ |
| PAPER SIZE DESIGNATION (A3) | NO DESIGNATION ▽ | PAPER SIZE DESIGNATION (A4) | Level.1 ▽ |
|  |  | TWO-COLOR PRINTING (CYAN) | NO DESIGNATION ▽ |
|  |  | TONER SAVE PRINTING | NO DESIGNATION ▽ |
|  |  | N-in-1 PRINTING (2 in 1) | Level.3 ▽ |
|  |  | DOUBLE-SIDED PRINTING | NO DESIGNATION ▽ |

| SECURITY-RELATED PRINTING PROCESS SETTING [PRIORITY: LEVEL 1 (HIGH) – LEVEL 5 (LOW)] | | | |
|---|---|---|---|
| CONFIDENTIAL PRINTING | NO DESIGNATION ▽ | WATERMARK PRINTING | NO DESIGNATION ▽ |
| DATA SAVING AFTER PRINTING | Level.2 ▽ | ENCRYPTION | NO DESIGNATION ▽ |
| TRANSFER (FTP) | NO DESIGNATION ▽ | TRANSFER (SMB) | NO DESIGNATION ▽ |
| TRANSFER PROHIBITED (FTP) | NO DESIGNATION ▽ | TRANSFER PROHIBITED (SMB) | NO DESIGNATION ▽ |
|  |  | DATA DELETION AFTER PRINTING | NO DESIGNATION ▽ |
|  |  | TRANSFER (MAIL) | NO DESIGNATION ▽ |
|  |  | TRANSFER PROHIBITED (MAIL) | NO DESIGNATION ▽ |

APPLY

F I G. 9

JOB ATTRIBUTE INFORMATION

| TRANSMISSION SOURCE INFORMATION | DESTINATION INFORMATION | | IMAGE DATA INFORMATION | | TRANSMISSION SOURCE PROCESS PROCEDURE |
|---|---|---|---|---|---|
| USER IDENTIFICATION INFORMATION | USER IDENTIFICATION INFORMATION | APPARATUS IDENTIFICATION INFORMATION OF HOME TERMINAL | APPARATUS IDENTIFICATION INFORMATION | FILE NAME | NORMAL PRINTING PROCESS / SECURITY-RELATED PRINTING PROCESS |

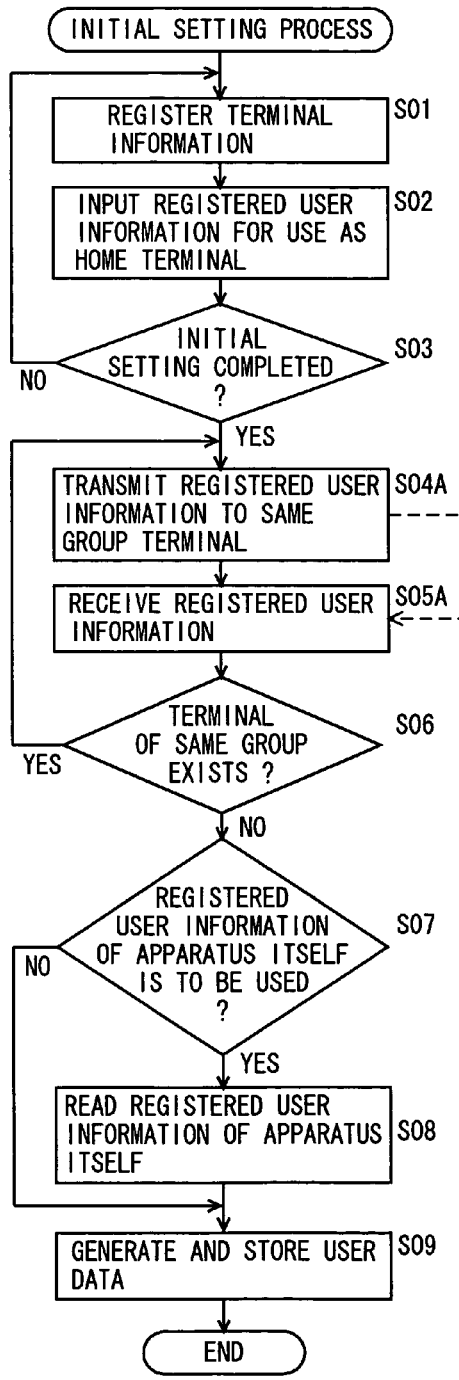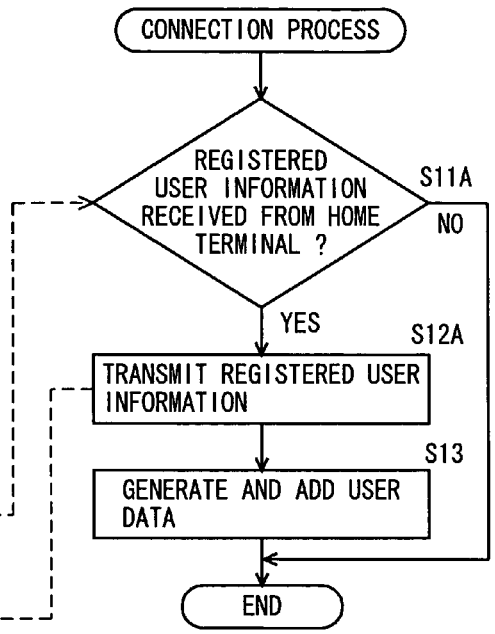
FIG. 14A / FIG. 14B

FIG. 15A

FIRST USER DATA OF MFP 100

| NUMBER | USER IDENTIFICATION INFORMATION | DIVISION NAME | E-mail ADDRESS | FACE IMAGE | PASSWORD |
|---|---|---|---|---|---|
| 1 | DAVID | SECRETARIAT | david@xxx.jp | david.jpg | xxx |
| 2 | JULIE | PLANNING DIVISION | julie@xxx.jp | julie.jpg | xxxx |
| 3 | TED | GENERAL AFFAIRS DIVISION | ted@xxx.jp | ted.jpg | xxxxx |
| 4 | MICHAEL | DEVELOPMENT DIVISION | michael@xxx.jp | michael.jpg | xxxxx |
| 5 | SUSAN | RESEARCH DIVISION | susan@xxx.jp | susan.jpg | xxxxxx |

FIG. 15B

SECOND USER DATA OF MFP 100

| NUMBER | USER IDENTIFICATION INFORMATION | DIVISION NAME | E-mail ADDRESS | FACE IMAGE | PASSWORD |
|---|---|---|---|---|---|
| 2 | JULIE | PLANNING DIVISION | julie@xxx.jp | julie.jpg | xxxx |
| 3 | TED | GENERAL AFFAIRS DIVISION | ted@xxx.jp | ted.jpg | xxxxx |
| 4 | MICHAEL | DEVELOPMENT DIVISION | michael@xxx.jp | michael.jpg | xxxxx |
| 5 | SUSAN | RESEARCH DIVISION | susan@xxx.jp | susan.jpg | xxxxxx |

F I G. 2 1

| SETTING ITEM | PRIORITY LEVEL | SETTING ITEM | PRIORITY LEVEL |
|---|---|---|---|
| COLOR PRINTING | NO DESIGNATION | DATA DELETION AFTER PRINTING | NO DESIGNATION |
| MONOCHROME PRINTING | Level.1 | DATA SAVING AFTER PRINTING | Level.1 |
| DOUBLE-SIDED PRINTING | Level.2 | TRANSFER (MAIL) | Level.2 |
| SINGLE-SIDED PRINTING | NO DESIGNATION | TRANSFER PROHIBITED (MAIL) | NO DESIGNATION |

PRIORITY: LEVEL 1 (HIGH) - LEVEL 5 (LOW)

FIG. 22

| SETTING ITEM | PRIORITY LEVEL |
|---|---|
| COLOR PRINTING | NO DESIGNATION |
| MONOCHROME PRINTING | NO DESIGNATION |
| DOUBLE-SIDED PRINTING | NO DESIGNATION/Level.1-Level.2 |
| SINGLE-SIDED PRINTING | NO DESIGNATION/Level.1-Level.2 |
| DATA DELETION AFTER PRINTING | NO DESIGNATION |
| DATA SAVING AFTER PRINTING | NO DESIGNATION |
| TRANSFER (MAIL) | NO DESIGNATION/Level.1 |
| TRANSFER PROHIBITED (MAIL) | NO DESIGNATION/Level.1 |

FIG. 23

| SETTING ITEM | PRIORITY LEVEL |
|---|---|
| COLOR PRINTING | NO DESIGNATION |
| MONOCHROME PRINTING | NO DESIGNATION |
| DOUBLE-SIDED PRINTING | NO DESIGNATION/Level.1-Level.2 |
| SINGLE-SIDED PRINTING | NO DESIGNATION/Level.1-Level.2 |
| DATA DELETION AFTER PRINTING | NO DESIGNATION/Level.1 |
| DATA SAVING AFTER PRINTING | NO DESIGNATION/Level.1 |
| TRANSFER (MAIL) | NO DESIGNATION/Level.1-Level.2 |
| TRANSFER PROHIBITED (MAIL) | NO DESIGNATION/Level.1-Level.2 |

FIG. 24

| SETTING ITEM | PRIORITY LEVEL |
|---|---|
| COLOR PRINTING | NO DESIGNATION |
| MONOCHROME PRINTING | NO DESIGNATION |
| DOUBLE-SIDED PRINTING | NO DESIGNATION/Level.1 |
| SINGLE-SIDED PRINTING | NO DESIGNATION/Level.1 |
| DATA DELETION AFTER PRINTING | NO DESIGNATION/Level.1 |
| DATA SAVING AFTER PRINTING | NO DESIGNATION |
| TRANSFER (MAIL) | NO DESIGNATION/Level.1 |
| TRANSFER PROHIBITED (MAIL) | NO DESIGNATION/Level.1-Level.2 |

DATA PROCESSING SYSTEM SUITED FOR TRANSMITTING AND RECEIVING DATA AMONG PLURALITY OF IMAGE PROCESSING APPARATUSES CONNECTED TO NETWORK, DATA PROCESSING METHOD, AND DATA PROCESSING PROGRAM PRODUCT

This application is based on Japanese Patent Application No. 2006-127136 filed with Japan Patent Office on Apr. 29, 2006, the entire content of which is hereby incorporated by reference.

BACKGROUND OF THE INVENTION

1. Field of the Invention

The present invention relates to a data processing system, a data processing method, and a data processing program product. More particularly, the present invention relates to a data processing system suited for transmitting and receiving data among a plurality of image processing apparatuses connected to a network, a data processing method, and a data processing program product.

2. Description of the Related Art

Recently, image processing apparatuses such as scanners, printers, and facsimiles are generally used in such a manner that they are connected to a network. In this usage manner, a technique has been developed for transmitting and receiving data for forming an image on paper or the like among a plurality of image processing apparatuses. When data is transmitted and received, there exist a receiver and a sender. There are a wide variety of process procedures such as conditions for subjecting data to image formation processing and methods of processing paper having image formed thereon. Although the sender of data wants the transmitted data to be output in an optimum process procedure, the receiver of data does not always set the process procedure as intended by the sender.

Japanese Laid-Open Patent Publication No. 2004-342038 discloses a printing system including a print designation device and a printing device. The print designation device includes designation means for designating a print condition, and transmission means for transmitting an email having a mail body and an attached image file with print setting information attached thereto based on the designated print condition. The printing device includes reception means for receiving the email transmitted from the print designation device, and setting means for setting a print condition for the mail body and the attached image file based on the print setting information attached to the email.

However, the printing system disclosed in Japanese Laid-Open Patent Publication No. 2004-342038 allows printing under the print condition decided at the sender side but does not allow setting of a print condition at the receiver side. In particular, printing is unfeasible when such a print condition is set that cannot be fulfilled by the printing device at the receiver side.

SUMMARY OF THE INVENTION

The present invention is made to solve the aforementioned problems. An object of the present invention is to provide a data processing system to allow a process procedure for processing data to be set at each of the sending side and the receiving side.

Another object of the present invention is to provide a data processing method to allow a process procedure for processing data to be set at each of the sending side and the receiving side.

A further object of the present invention is to provide a data processing program product to allow a process procedure for processing data to be set at each of the sending side and the receiving side.

In order to achieve the above-noted objects, in accordance with an aspect of the present invention, a data processing system includes: a user data storing portion to store user data including at least user identification information for identifying a user; a destination designation portion to accept designation of the user identification information included in the user data as a destination of data; a data designation portion to accept designation of data to be delivered to the destination designated by the destination designation portion; a transmission source process procedure accepting portion to accept a transmission source process procedure which defines a plurality of processes to be executed on data designated by the data designation portion; a related data generation portion to generate related data in which the designated user identification information, the designated data, and the accepted transmission source process procedure are related to one another; a user identification information input portion to accept an input of user identification information; a transmission destination process procedure obtaining portion to obtain a transmission destination process procedure which is registered beforehand corresponding to the input user identification information and defines a plurality of processes to be executed on data; a data obtaining portion to obtain data related to the input user identification information by the related data; a process procedure decision portion to decide a final process procedure based on the transmission source process procedure related to the obtained data by the related data and the obtained transmission destination process procedure; and a processing execution portion to process the obtained data according to the final process procedure decided by the process procedure decision portion.

In accordance with this aspect, when user identification information and data are designated and a transmission source process procedure is accepted, related data is generated in which the user identification information, the data, and the transmission source process procedure are related to one another. Then, upon input of user identification information, a transmission destination process procedure is obtained which is registered beforehand corresponding to the input user identification information and defines a plurality of processes to be executed on data. Based on the transmission source process procedure related to the obtained data by the related data and the transmission destination process procedure, a final process procedure is decided. The data related to the input user identification information is processed according to the final process procedure. Since the final process procedure is decided based on the transmission source process procedure and the transmission destination process procedure, data is processed according to a process defined by either the transmission source process procedure decided by the data sending side or the transmission destination process procedure at the data receiving side. Therefore, it is possible to provide a data processing system that allows a process procedure for processing data to be set at each of the sending side and the receiving side.

In accordance with another aspect of the present invention, a data processing system includes: a user data storing portion to store user data including at least user identification information for identifying a user; a destination designation portion to accept designation of the user identification information included in the user data as a destination of data; a data designation portion to accept designation of data to be delivered to the destination designated by the destination designation portion; a transmission destination process procedure obtaining portion to obtain a transmission destination process procedure which is registered beforehand corresponding to the user identification information designated by the destination designation portion and defines a plurality of processes to be executed on data; a transmission source process procedure accepting portion to accept a transmission source process procedure which defines a plurality of processes to be executed on data designated by the data designation portion, with reference to the obtained transmission destination process procedure; a related data generation portion to generate related data in which the designated user identification information, the designated data, and the accepted transmission source process procedure are related to one another; a user identification information input portion to accept an input of user identification information; a data obtaining portion to obtain data related to the input user identification information by the related data; and a processing execution portion to process the obtained data according to the transmission source process procedure related to the obtained data by the related data.

In accordance with this aspect, upon designation of user identification information and data, a transmission destination process procedure is obtained which is registered beforehand corresponding to the designated user identification information and defines a plurality of processes to be executed on data. With reference to the obtained transmission destination process procedure, a transmission source process procedure is accepted which defines a plurality of processes to be executed on the designated data. Since the transmission source process procedure is accepted with reference to the transmission destination process procedure, the transmission source process procedure can be accepted while the transmission destination process procedure at the data receiving side is reflected as much as possible. As a result, it is possible to provide a data processing system that allows a process procedure for processing data to be set at each of the sending side and the receiving side.

In accordance with a further aspect of the present invention, a data processing method includes the steps of storing user data including at least user identification information for identifying a user; in setting an output of data, accepting designation of the user identification information included in the user data as a destination of data; accepting designation of data to be delivered to the designated destination; accepting a transmission source process procedure which defines a plurality of processes to be executed on the designated data; and generating related data in which the designated user identification information, the designated data, and the accepted transmission source process procedure are related to one another; and in outputting data, accepting an input of user identification information; obtaining a transmission destination process procedure which is registered beforehand corresponding to the input user identification information and defines a plurality of processes to be executed on data; extracting data related to the input user identification information by the related data; deciding a final process procedure based on the transmission source process procedure related to the obtained data by the related data and the obtained transmission destination process procedure; and processing the extracted data according to the decided final process procedure.

In accordance with this aspect, it is possible to provide a data processing method that allows a process procedure for processing data to be set at each of the sending side and the receiving side.

In accordance with yet another aspect of the present invention, a data processing method includes the steps of storing user data including at least user identification information for identifying a user; in setting an output of data, accepting designation of the user identification information included in the user data as a destination of data; accepting designation of data to be delivered to the designated destination; obtaining a transmission destination process procedure which is registered beforehand corresponding to the designated user identification information and defines a plurality of processes to be executed on data; accepting a transmission source process procedure which defines a plurality of processes to be executed on the designated data, with reference to the obtained transmission destination process procedure; and generating related data in which the designated user identification information, the designated data, and the accepted transmission source process procedure are related to one another; and in outputting data, accepting an input of user identification information; obtaining data related to the input user identification information by the related data; and processing the obtained data according to the transmission source process procedure related to the obtained data by the related data.

In accordance with this aspect, it is possible to provide a data processing method that allows a process procedure for processing data to be set at each of the sending side and the receiving side.

In accordance with still another aspect of the present invention, a data processing program product causes a computer to execute the steps of: storing user data including at least user identification information for identifying a user; in setting an output of data, accepting designation of the user identification information included in the user data as a destination of data; accepting designation of data to be delivered to the designated destination; accepting a transmission source process procedure which defines a plurality of processes to be executed on the designated data; and generating related data in which the designated user identification information, the designated data, and the accepted transmission source process procedure are related to one another; and in outputting data, accepting an input of user identification information; obtaining a transmission destination process procedure which is registered beforehand corresponding to the input user identification information and defines a plurality of processes to be executed on data; extracting data related to the input user identification information by the related data; deciding a final process procedure based on the transmission source process procedure related to the obtained data by the related data and the obtained transmission destination process procedure; and processing the extracted data according to the decided final process procedure.

In accordance with this aspect, it is possible to provide a data processing program product that allows a process procedure for processing data to be set at each of the sending side and the receiving side.

In accordance with a further aspect of the present invention, a data processing program product causes a computer to execute the steps of: storing user data including at least user identification information for identifying a user; in setting an output of data, accepting designation of the user identification information included in the user data as a destination of data; accepting designation of data to be delivered to the designated destination; obtaining a transmission destination process procedure which is registered beforehand corresponding to the designated user identification information and defines a plurality of processes to be executed on data; accepting a transmission source process procedure which defines a plurality of processes to be executed on the designated data, with reference to the obtained transmission destination process procedure; and generating related data in which the designated user identification information, the designated data, and the accepted transmission source process procedure are related to one another; and in outputting data, accepting an input of user identification information; obtaining data related to the input user identification information by the related data; and processing the obtained data according to the transmission source process procedure related to the obtained data by the related data.

In accordance with this aspect, it is possible to provide a data processing program product that allows a process procedure for processing data to be set at each of the sending side and the receiving side.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 3A is a flowchart illustrating an exemplary flow of an initial setting process.

FIG. 3B is a flowchart illustrating an exemplary flow of a connection process.

FIG. 4 is a diagram illustrating registered user information and first and second user data.

FIG. 7 is a first diagram showing an exemplary process procedure setting window.

FIG. 9 is a diagram showing an exemplary format of job attribute information.

FIGS. 14A and 14B are other flowcharts illustrating an exemplary flow of a process performed when MFP is newly connected to a network.

FIGS. 15A and 15B are diagrams illustrating first and second user data in a modification.

FIG. 21 is a diagram showing a specific example of a transmission destination process procedure.

FIG. 22 is a first diagram exemplarily showing a priority level that can be set according to a prescribed rule.

FIG. 23 is a second diagram exemplarily showing a priority level that can be set according to a prescribed rule.

FIG. 24 is a third diagram exemplarily showing a priority level that can be set according to a prescribed rule.

DESCRIPTION OF THE PREFERRED EMBODIMENTS

Figure 1:
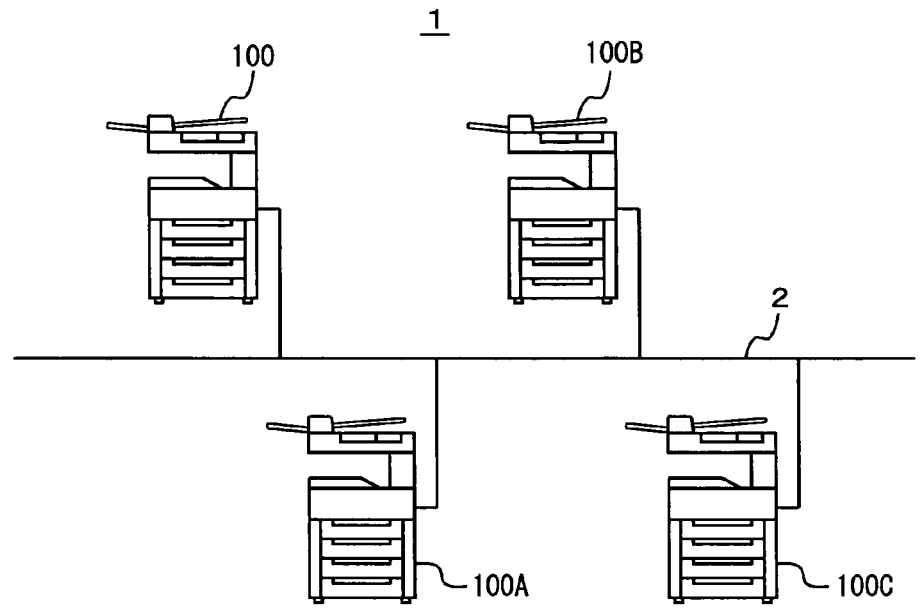
FIG. 1 is an overall schematic diagram of a data processing system according to a first embodiment of the present invention.

The embodiments of the present invention will be described below with reference to the drawings. In the following description, the same or corresponding parts are denoted by the same reference characters. Their names and function are also the same. Thus, a detailed description thereof will not be repeated.

First Embodiment

FIG. 1 is an overall schematic diagram showing a data processing system according to the first embodiment of the present invention. With reference to FIG. 1, a data processing system 1 includes multi function peripherals (referred to as "MFP" below) 100, 100A, 100B, and 100C, each connected to a network 2. The configuration and the function of MFP 100, 100A, 100B, and 100C are the same, and therefore MFP 100 will be described here as an example unless otherwise noted.

MFP 100 includes a scanner for scanning a sheet of original manuscript, an image forming portion for forming an image on recording media such as a sheet of paper based on image data, and a facsimile, and has an image scanning function, a copying function, and a facsimile transmission and reception function. Moreover, although MFP 100 is described as an example in the this embodiment, MFP 100 can be replaced by, for instance, a scanner, an image forming apparatus, a facsimile, a computer, and the like.

Network 2 is a local area network (IAN) and the form of connection can be fixed-line or wireless. In addition, network 2 is not limited to a LAN and can be a wide area network (WAN), the Internet, and so on.

Figure 2:
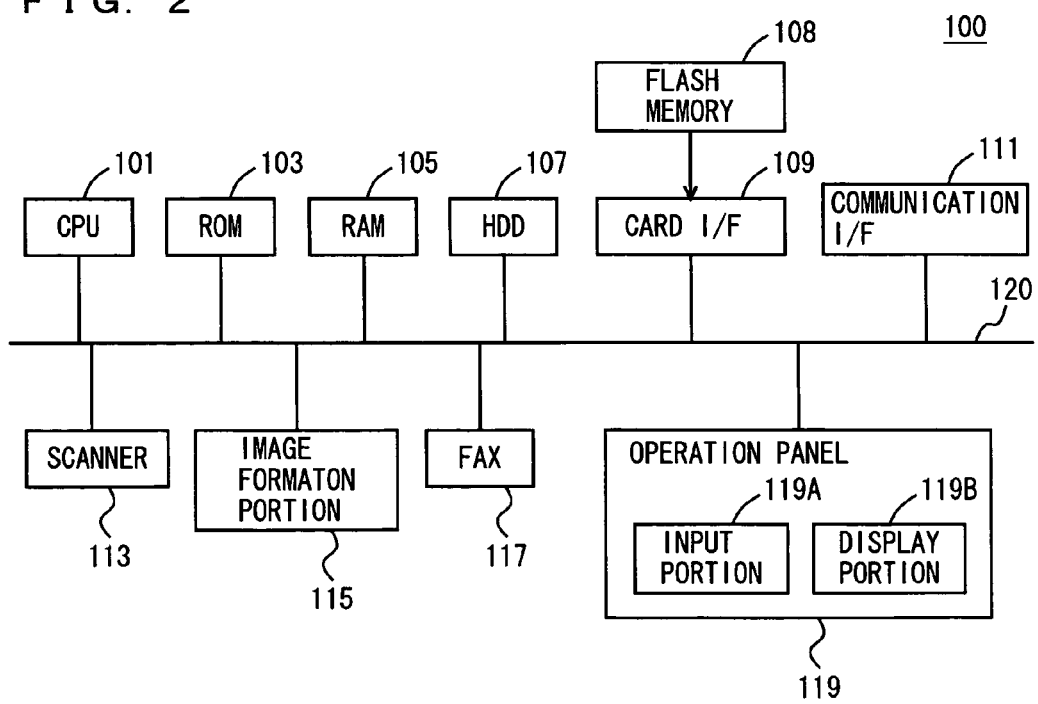
FIG. 2 is a block diagram showing an exemplary hardware configuration of an MFP according to the first embodiment.

FIG. 2 is a block diagram showing an exemplary hardware configuration of MFP 100 according to this embodiment. With reference to FIG. 2, MFP 100 includes, each connected to a bus 120, a central processing unit (CPU) 101, a ROM (Read Only Memory) 103 that stores a program or the like to be executed by CPU 101, a RAM (Random Access Memory) 105 for loading a program to be executed and for storing data during execution of the program, a hard disk drive (HDD) 107 for storing data in a nonvolatile manner, a card interface (I/F) 109 to which a flash memory 108 is attached, a communication I/F 111 for connecting MFP 100 to network 2, a scanner 113, an image forming portion 115, a facsimile (FAX) 117, and an operation panel 119 as an interface with a user.

CPU 101 loads into RAM 105 and executes a data processing program stored in flash memory 108 attached to card I/F 109. Moreover, the program executed by CPU 101 is not limited to the data processing program stored in flash memory 108, and a program stored in an EEPROM (Electrically Erasable/Programmable Read Only Memory) connected additionally to CPU 101 can be loaded into RAM 105 and be executed. The use of an EEPROM makes it possible to rewrite or additionally write a data processing program. Thus, another computer connected to network 2 can rewrite the data processing program stored in the EEPROM of MFP 100 or additionally write a new data processing program into the EEPROM. Furthermore, MFP 100 can download a data processing program from another computer connected to network 2 and store the data processing program in an EEPROM.

Moreover, these programs may not always be read from flash memory 108 for execution. The program stored in ROM 103 may be read. A program read from flash memory 108 can be stored in an EEPROM connected to CPU 101 and that program can then be read and executed. Furthermore, by saving a data processing program stored in the flash memory into HDD 107 first, the program can be loaded from HDD 107 into RAM 105 and be executed.

The program referred to here not only includes a program directly executable by CPU 101, but also a source program, a compressed program, an encrypted program, and the like.

Image forming portion 115 is a laser printer, an ink jet printer, or the like, and makes image data visible on recording media such as a sheet of paper. Scanner 113 includes a photoelectric transducer such as a CCD (Charge Coupled Device) and the like, and optically reads a sheet of original manuscript and outputs electronic data that is the image data. FAX 117 transmits and receives the image data according to the facsimile protocol via Public Switched Telephone Network (PSTN).

Operation panel 119 includes an input portion 119A and a display portion 119B. Input portion 119A is an input device such as a touch panel, a keyboard, or a mouse for accepting an input of operation by a user of MFP 100. Display portion 119B is a liquid crystal display or an organic EL (Electro-Luminescence) display panel. When using a touch panel formed of a transparent member for input portion 119A, the touch panel is provided to overlap display portion 119B so that an instruction to a button displayed on display portion 119B can be detected. Thus, input of a variety of operations becomes possible.

Communication I/F 111 is a communication interface for connecting MFP 100 to network 2. MFP 100 can communicate with other MFPs 100A, 100B, 100C. Although MFP 100 is connected to other MFPs 100A, 100B, and 100C via network 2, it can also be connected directly using a serial interface or a parallel interface. Communication I/F 111 uses an interface that corresponds to the form of connection between MFP 100 and other MFPs 100A, 100B, and 100C.

The input of data into MFP 100 includes the following cases: (1) when scanner 113 scans a sheet of original manuscript and the image data is input; (2) when image data is received from another computer or from other MFPs 100A, 100B, and 100C connected to network 2 via communication I/F; (3) when image data stored in flash memory 108 is read via card I/F; and (4) when facsimile data is received in FAX 117.

The output of data from MFP 100 includes the following cases: (1) data is made visible on recording media such as a sheet of paper by image forming portion 115; (2) data is transmitted to another computer or to other MFPs 100A, 100B, and 100C connected to the network via communication I/F 111; (3) data is stored in flash memory 108; (4) data is output as facsimile data by FAX 117; and (5) data is displayed on display portion 119B.

Moreover, a storage medium that stores a data processing program is not limited to flash memory 108 and can also be media such as a flexible disk, a cassette tape, an optical disk (MO (Magnetic Optical Disc)/MD (Mini Disc)/DVD (Digital Versatile Disc)), an IC card (including a memory card), an optical card, and a semiconductor memory such as a mask ROM, an EPROM, an EEPROM.

In data processing system 1 according to this embodiment, for each of MFPs 100, 100A, 100B, and 100C, a user who mainly uses the apparatus is fixed. Thus, each of MFPs 100, 100A, 100B, and 100C stores registered user information in order to register the user who mainly uses it. The registered user information, which will be described later, includes at least user identification information for identifying a user. The name of the user can be used as the user identification information. Here, based on the user, any one or more of MFPs 100, 100A, 100B, and 100C which store the registered user information of that user are referred to as "home terminals." For instance, if the registered user information of the user "David" is stored in MFP 100, a home terminal of the user "David" is MFP 100. Moreover, registered user information is stored in each of MFPs 100, 100A, 100B, and 100C to define a user who mainly uses the apparatus but not to prohibit the user whose registered user information is not stored therein from using it.

Here, it is assumed that MFP 100 is newly connected to network 2 where MFPs 100A, 100B, and 100C have already been connected thereto. For MFP 100, it is necessary to set apparatus identification information for identifying MFP 100 and the above-described registered user information. When the apparatus identification information and the registered user information are set for MFP 100, MFP 100 transmits the apparatus identification information and the registered user information to other MFPs 100A, 100B, and 100C. Thus, data processing system 1 is formed in MFPs 100, 100A, 100B, and 100C.

FIG. 3A is a flowchart illustrating an exemplary flow of an initial setting process. The initial setting process is executed in MFP 100 when MFP 100 is newly connected to network 2. FIG. 3B is a flowchart illustrating an exemplary flow of a connection process. The connection process is executed in each of MFPs 100A, 100B, and 100C already connected to network 2 when MFP 100 is newly connected to network 2. The initial setting process and the connection process are implemented by having an initial setting program and a connection program that are stored in flash memory 108 loaded into RAM 105 and executed by CPU 101, in each of MFPs 100, 100A, 100B, and 100C. The initial setting program and the connection program are part of the data processing program.

With reference to FIG. 3A, terminal information is registered in MFP 100 (step S01). The terminal information is accepted by MFP 100 and registered by the user inputting the terminal information to operation panel 119 according to a terminal registration window appearing on display portion 119B. The terminal information at least includes apparatus identification information for identifying MFP 100. The apparatus identification information is preferably location information assigned to MFP 100 in network 2, and is here an IP (Internet Protocol) address. The terminal information can include information showing the location where MFP 100 is disposed.

Next, registered user information of a user who uses MFP 100 as a home terminal is input into MFP 100 (step S02). The registered user information is received by MFP 100 by the user inputting the registered user information to operation panel 119 according to a registered user information input window appearing on display portion 119B. When a plurality of users use MFP 100 as a home terminal, registered user information of each of the plurality of users is input. The registered user information at least includes user identification information for identifying the user. The user identification information needs only to be unique information such as a user ID including characters or symbols and a name of the user. Here, a user name is used as the user identification information. The registered user information can also include accompanying information and authentication information in addition to the user identification information.

The user inputs the terminal information, and upon completion of the user registration process, the user gives an instruction to input portion 119A on a completion button displayed on display portion 119B, so that it is detected in MFP 100 that the initial setting has been completed. The registration of the terminal information in step S01 and the input of the registered user information in step S02 are usually performed by the administrator of the terminal.

Then, it is determined whether the initial setting is completed or not (step S03). If the initial setting is completed, the process proceeds to step S04, and if it is not completed, the process goes back to step S01. In step S04, the terminal information and the registered user information for which initial setting has already been performed are transmitted to the terminals in the same group. The same group refers to a set of terminals which form data processing system 1. Here, MFPs 100, 100A, 100B, and 100C connected to network 2 are considered to be of the same group. Thus, by transmitting an inquiry by broadcast on network 2, MFP 100 receives the IP addresses of terminals respectively transmitted back from MFPs 100A, 100B, and 100C in the same group in response to the inquiry. In this manner, the IP addresses of the terminals that form the same group are obtained. Moreover, by grouping, a plurality of terminals connected to network 2 can be divided into different groups. For instance, MFPs 100 and 100A can form one group, while MFPs 100B and 100C can form another group. Such grouping is set by a user. More specifically, as described above, MFP 100 receives the respective IP addresses of MFPs 100A, 100B, and 100C connected to network 2 and detects MFPs 100A, 100B, and 100C, and the user designates which of MFPs 100A, 100B, and 100C should be in the same group as MFP 100, whereby an apparatus to be included in the group is specified.

MFP 100 transmits terminal information and registered user information to one terminal chosen from MFPs 100A, 100B, and 100C set as the same group. Here, MFP 100A is selected, and the terminal information and the registered user information of MFP 100 are transmitted from MFP 100 to MFP 100A, by way of example.

Now, with reference to FIG. 3B, MFP 100A receives the terminal information and the registered user information of MFP 100 transmitted from MFP 100 (step S11). In response to this reception, MFP 100A transmits to MFP 100 the terminal information and the registered user information stored in HDD 107 of MFP 100A (step S12). In other words, the connection process is a process performed on condition that a request is received from MFP 100 that performs the initial setting process. In the next step S13, user data is generated based on the terminal information and the registered user information of MFP 100 received in step S11, and the generated user data is added to user data already stored in HDD 107.

Going back to FIG. 3A, MFP 100 receives the terminal information and the registered user information of MFP 100A transmitted from MFP 100A (step S05). Then, it is determined whether or not a terminal to which the terminal information and the registered user information have not yet been transmitted exists among the terminals of the same group (step S06). If such a terminal exists, that terminal is selected and the process goes back to step S04, but if not, the process proceeds to step S07. Here, since the terminal information and the registered user information have not yet been transmitted to MFPs 100B and 100C, either of these two is selected and the process goes back to step S04. Thus, MFP 100 transmits the terminal information and the registered user information of MFP 100 to the terminals of the same group one by one (step S04), and receives from each terminal the terminal information and the registered user information of that terminal (step S05). Moreover, although, here, the terminals of the same group are selected one by one and the terminal information and the registered user information are transmitted accordingly, the terminal information and the registered user information can be transmitted by broadcast, and the terminal information and the registered user information stored in MFPs 100A, 100B, and 100C can be received from MFPs 100A, 100B, and 100C, respectively.

In step S07, it is determined whether or not the registered user information of the apparatus itself is to be used for the user data generation. This determination can be based on a selection made by a user, or it can be predetermined. If it is determined that the registered user information of the apparatus itself is to be used, the process proceeds to step S08, and if it is determined that it is not to be used, step S08 is skipped and the process proceeds to step S09. In step S08, the registered user information stored in MFP 100 is read. Then, in step S09, the user data is generated from the terminal information and the registered user information. If step S08 is skipped, user data is generated from the registered user information and the terminal information received from each of terminal MFPs 100A, 100B, 100C. If step S08 is executed, user data is generated from the registered user information received from each of MFPs 100A, 100B, 100C and the registered user information stored in MFP 100 and the terminal information of each of MFPs 100, 100A, 100B, 100C. The user data includes the terminal information and the registered user information. Moreover, although the user data includes the terminal information and the registered user information in this embodiment, the user data needs only to include at least the registered user information. Here, the user data generated when MFP 100 determines that the registered user information of its own is used in step S07 is referred to as first user data, and the user data generated when MFP 100 determines that the registered user information of its own is not used in step S07 is referred to as second user data. Then, the generated user data is stored in HDD 107.

When the first user data is generated in all of MFPs 100, 100A, 100B, and 100C, all of MFPs 100, 100A, 100B, 100C store the same user data. On the other hand, when MFP 100A generates the second user data, that second user data includes user data in which terminal information of MFPs 100, 100B, 100C are related with the registered user information stored in MPFs 100, 100B, 100C, respectively. When MFP 100B generates the second user data, that second user data includes user data in which terminal information of MFPs 100, 100A, 100C are related with the registered user information stored in MPFs 100, 100A, 100C, respectively. When MFP 100C generates the second user data, that second user data includes user data in which terminal information of MFPs 100, 100A, 100B are related with the registered user information stored in MFPs 100, 100A, 100B, respectively.

Moreover, here, while the terminal registration process and the registered user information input process are performed in the initial setting process executed in MFP 100, a process similar to this initial setting process is executed in the case where MFP 100 has already been connected to network 2 and a user is to be added. In such a case, however, the terminal information registration process in step S01 is not required.

In addition, the initial setting process can be performed not only when each of MFPs 100, 100A, 100B, and 100C is connected to network 2 but also after the power is turned on in each of MFPs 100, 100A, 100B, and 100C, or at prescribed time intervals. For instance, when a user is newly registered in MFP 100, the registered user information of the newly registered user is transmitted to other MFPs 100A, 100B, 100C so that the latest user data is stored in other MFPs 100A, 100B, 100C. In this case, without executing steps S01 and S03 of the initial setting process shown in FIG. 3A, MFP 100 performs the registered user information input process in step S02. Accordingly, MFP 100 obtains the registered user information of the user newly registered in any other MFP 100A, 100B, 100C, conversely, in order to store the latest user data in MFP 100. In this case, without executing the process in steps S01 to S03 of the initial setting process shown in FIG. 3A, MFP 100 executes a process of requesting transmission of the registered user information from other MFPs 100A, 100B, 100C. This transmission request for the registered user information at least includes apparatus identification information. In response to this transmission request, each of other MFPs 100A, 100B, and 100C executes the connection process shown in FIG. 3B, and in step S11 in response to the transmission request being received, transmits the registered user information stored in its HDD 107 to MFP 100 that transmitted the transmission request. Thus, even when the registered user information stored in HDDs 107 of other MFPs 100A, 100B, and 100C is altered, user data will be generated from the altered registered user information and stored in HDD 107. In this case, each of MFPs 100A, 100B, 100C needs not execute step S13 in the connection process.

FIGS. 4A to 4F are diagrams illustrating the registered user information and the first and second user data. FIG. 4A is a diagram showing an example of registered user information stored in MFP 100, FIG. 4B is a diagram showing an example of registered user information stored in MFP 100A, FIG. 4C is a diagram showing an example of registered user information stored in MFP 100B, and FIG. 4D is a diagram showing an example of registered user information stored in MFP 100C. The registered user information includes user identification information, accompanying information, authentication information, and a transmission destination process procedure. The accompanying information is the information related to a user, such as the name of the division the user belongs to, an email address assigned to that user, face image data obtained by capturing the face of that user, and so on. The authentication information is the information used for authentication of the user at log-in, and here, a password is used. It is also possible to use the face image data as the authentication information. When biometrics authentication is used, a fingerprint, sound spectrogram, iris, vein pattern, and the like are used for authentication information.

The transmission destination process procedure defines a process executed on the data transmitted to a user and a priority level corresponding to that process. The transmission destination process procedure defines a normal printing process and a security-related printing process, similar to a transmission source process procedure described later. The transmission source process procedure will be described later.

Furthermore, FIG. 4E is a diagram showing an example of first user data, and FIG. 4F is a diagram showing an example of second user data stored in MFP 100A. The first user data or the second user data is generated and stored in each of MFPs 100, 100A, 100B, 100C when the initial setting process shown in FIG. 3A is performed in MFP 100 and the connection process shown in FIG. 3B is performed in each of MFPs 100A, 100B, 100C. The first and second user data includes a number, registered user information, apparatus identification information of a home terminal, and the location where the home terminal is disposed. The user data needs only to include at least the user identification information and the apparatus identification information of a home terminal.

Although an example in which the email address assigned to a user is saved as accompanying information is illustrated in the above-described embodiment, a facsimile transmission, an FTP (File Transfer Protocol), or the like can be used. In such cases, information suited for the method of data transmission and reception would be saved.

In this manner, when the initial setting process is executed in MFP 100, in MFPs 100, 100A, 100B, and 100C set to be of the same group, the same first user data is generated and stored, or second user data including all of the registered user information of other terminals of the same group is generated. Thus, data processing system 1 constructed by MFPs 100, 100A, 100B, and 100C is formed. When data processing system 1 is formed, the user who uses one of MFPs 100, 100A, 100B, and 100C as a home terminal can be specified based on the user data so that data transmission and reception among users can be performed using the user data. The process executed by MFPs 100, 100A, 100B, and 100C for such data transmission and reception is herein referred to as a job. Moreover, the data transmission and reception performed by execution of such a job is called BOX transmission and reception.

A user inputs a job at one of MFPs 100, 100A, 100B, and 100C in order to transmit data. Moreover, when a job whose destination is the user himself exists, the user instructs any of MFPs 100, 100A, 100B, and 100C to execute the job and thus to output the data. Hereinafter, among MFPs 100, 100A, 100B, and 100C, a terminal into which the user inputs a job is referred to as a job input terminal, and among MFPs 100, 100A, 100B, and 100C, a terminal which the user instructs to output a job is referred to as a job output terminal. Here, to simplify the description, the example will be illustrated in which the user of user identification information "David" operates MPF 100 to input the job of transmitting image data to the destination with user identification information "Julie." In this case, MFP 100 is a job input terminal and executes a job input process. MFP 100 that executes the job input process executes the process of authenticating the user in response to a log-in request from the user "David," and thereafter executes a job setting process. Moreover, although the example of executing the job input process at a home terminal is described here, the job input process can also be executed at a terminal other than the home terminal.

Figure 5:
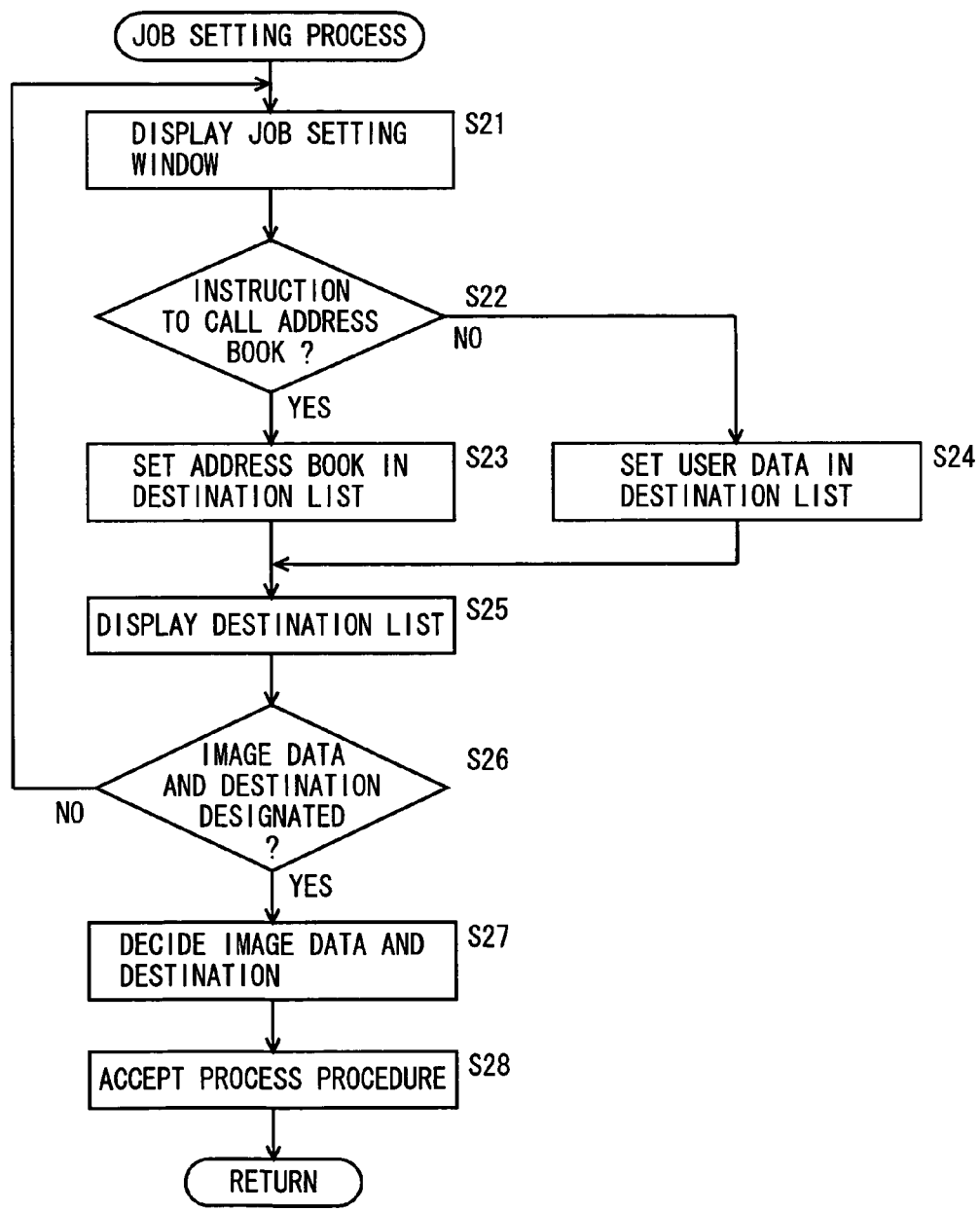
FIG. 5 is a flowchart illustrating an exemplary flow of a job setting process.

FIG. 5 is a flowchart illustrating a flow of the job setting process. The job setting process is implemented by having a job setting program that is stored in flash memory 108 loaded into RAM 105 of MFP 100 and executed by CPU 101. The job setting program is a part of a data processing program. Moreover, it is prerequisite that the user "David" has logged into MFP 100 prior to the execution of the job setting program. This is to allow MFP 100 to specify the user who operates it.

With reference to FIG. 5, in the job setting process, MFP 100 displays a job setting window on display portion 119B (step S21). The job setting window is a window for setting data to be transmitted and a destination of the transmission. The job setting window will be described later. Then, it is determined whether a call instruction to call an address book is input or not (step S22). If a call instruction is input, the process proceeds to step S23, and if it is not input, the process proceeds to step S24. The address book is data unique to a user that is stored in advance in association with the log-in user, or here, with the user identification information "David." The address book at least includes user identification information and apparatus identification information of the home terminal of that user. The address book can include an email address. Further, the address book can include a facsimile number. In step S23, the address book is read and is set in a destination list. In step S24, user data is read, and the user data is set in the destination list. In this case, it is not required to newly generate the destination list, and the destination list can be displayed even when an address book does not exist. Then, the destination list is displayed on the job setting window (step S25).

Further, it is determined whether or not the image data to be transmitted and the destination are designated in the job setting window (step S26), and if they are designated, the process proceeds to step S27, and if not, the process goes back to step S21. In step S27, the image data and the destination designated in step S26 are decided to be the image data to be transmitted and the destination, respectively. Then, in the next step S28, a process procedure is accepted. MFP 100 displays a process procedure setting window on display portion 119B and accepts the process procedure input into input portion 119A. The process procedure setting window is a window for accepting a process procedure designated by the user of a transmission source. Then, a transmission source process procedure is decided based on the accepted process procedure.

Figure 6A:
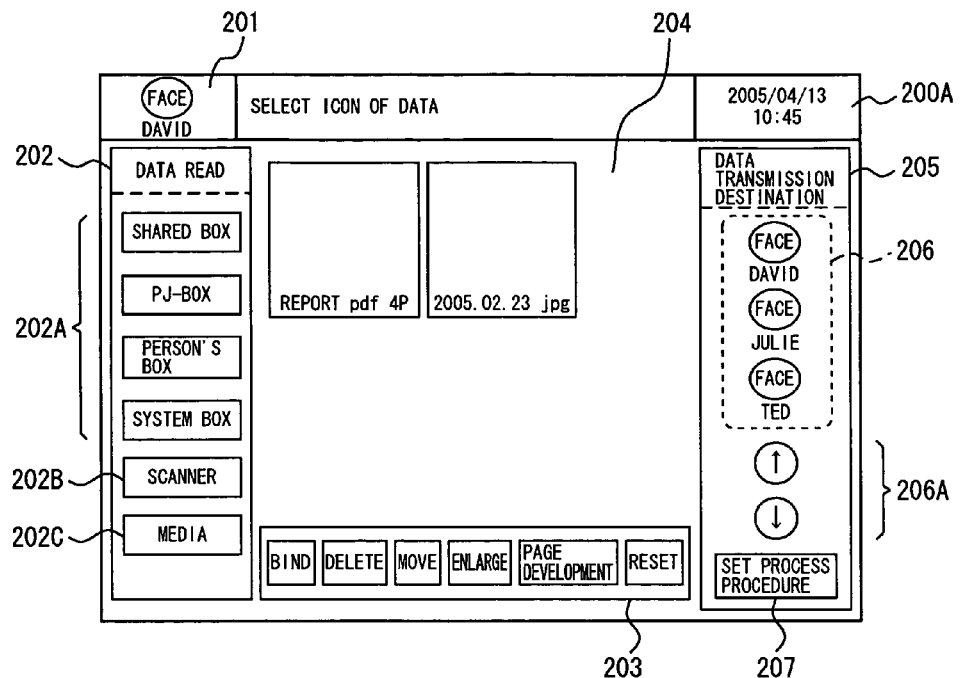
FIG. 6A is a diagram showing an exemplary job setting window.

FIG. 6A is a diagram illustrating an example of the job setting window. With reference to FIG. 6A, a job setting window 200 includes an area 201 for displaying information specifying an operator, an area 202 for accepting an input instruction or a selection instruction for data to be transmitted, an area 203 for giving an instruction to process data input or selected in area 202, an area 204 for accepting designation of the image data to be transmitted, and an area 205 for accepting designation of a transmission destination and a process procedures.

In area 201, as the information to specify the log-in user "David" who is the operator, the user name "David" as the user identification information and the face image of David are displayed. Moreover, although the characters "FACE" are shown in the diagram for convenience, in practice the face image will be displayed.

Area 202 includes a button 202A for designating an area of HDD 107, a button 202B for giving an instruction to input image data from scanner 113, and a button 202C for giving an instruction to input image data from another image data input device. When button 202A receives the instruction, a thumbnail that displays in reduction the image data stored in the area of HDD 107 corresponding to that button is displayed in area 204. When button 202B receives the instruction, scanner 113 is activated and the thumbnail of image data output by scanner 113 is displayed in area 204. When button 202C receives the instruction, image data from another image data input device is input, and the thumbnail of the input image data is displayed in area 204. Another image data input device is, for instance, a computer connected to network 2, an external storage device, and the like.

The user designates the thumbnail displayed in area 204, so that the image data corresponding to the designated thumbnail is specified by MFP100 as the image data to be transmitted. In addition, when the user gives an instruction to the button displayed in area 203, MFP 100 executes such processes on the image data designated in area 201 as a bind process of putting together a plurality of image data, a deletion process of deleting the image data from the object of selection, a move process for changing the order, a process of enlarging the image data, a page development process of putting together a plurality of image data into one image data, and a reset process of canceling the designated process.

Area 205 is an area for setting a transmission source and a process procedure. Area 205 includes an area 206 that displays a destination list to designate a transmission destination, a button 206A for scrolling the display of the destination list, and a button 207 for displaying a process procedure setting window for setting a process procedure. At least a part of the destination list is displayed in area 206. In the destination list, either of the address book or the user data is set by the above-described job setting process. The destination list at least includes the user identification information. Thus, the user identification information is displayed in area 206. Moreover, when the destination list includes a face image as accompanying information, that face image is displayed adjacent to the user identification information. Here, although three of the destinations included in the destination list are displayed in area 206, they are changed another destination by the user giving an instruction on button 206A. When the user gives an instruction on button 207, MFP 100 displays a process procedure setting window. The process procedure setting window will be described later.

Figure 6B:
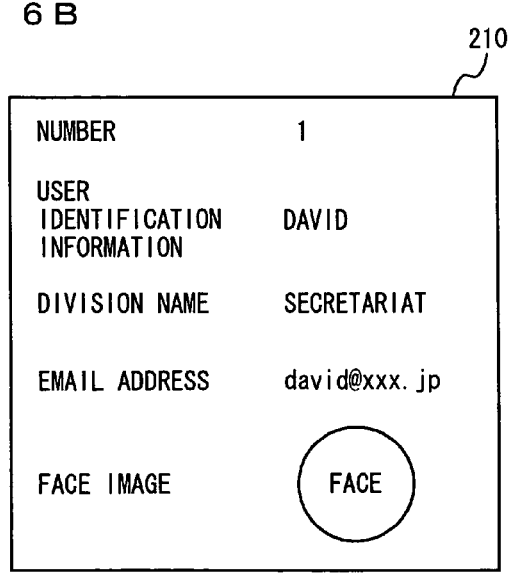
FIG. 6B is a diagram showing an exemplary sub-window.

Furthermore, the user specifies the user identification information displayed in area 206, so that MFP 100 displays detailed information of the user in a sub-window. The sub-window is displayed on the job setting window in an overlapping manner. The information displayed in the sub-window includes at least a part of the user data. FIG. 6B is a diagram illustrating an example of the sub-window. With reference to FIG. 6B, the sub-window includes the user identification information, division name, email address, and face image of the user data of the user identification information "David."

FIG. 7 is a first diagram showing an exemplary process procedure setting window. The process procedure setting window is displayed on display portion 119B by the user giving an instruction on button 207 while the job setting window is being displayed. The process procedure setting window is a window for setting a plurality of processes executed on data and a level corresponding to each of a plurality of processes. Here, the priority levels are set in five stages from Level 1 to Level 5. Referring to FIG. 7, the process procedure setting window largely includes an area for setting a normal printing process and an area for setting a security-related printing process that is concerned with security.

The area for setting a normal printing process includes an area for setting a print color, an area for setting a toner save mode, an area for setting a resolution, an area for setting N-in-1 print, an area for setting double-sided print, and an area for setting a paper size. The area for setting a print color includes a setting item for designating color printing, a setting item for designating monochrome printing, a setting item for designating two-color printing using cyan and black, a setting item for designating two-color printing using magenta and black, and a setting item for designating two-color printing using yellow and black. The five setting items included in the area for setting a print color are associated with mutually contradictory processes. This allows designation of any one of five setting items included in the area for setting a print color. An area for setting a priority level is arranged adjacent to each of the five setting items. A level is set in the area for setting a priority level so that the process corresponding to the setting item having the level set and the priority level are defined as a transmission source process procedure. The figure exemplarily shows that Level 1 is set in the area for setting a priority level corresponding to the setting item of color printing, so that the color printing process and the priority level "Level 1" are defined as a transmission source process procedure. The priority level includes five stages from Level 1 to Level 5. Level 1 is the highest priority. When Level 1 is set in the area for setting a priority level corresponding to the setting item of color printing, "no designation" is set in all of the areas for setting a priority level corresponding to the four setting items excluding the setting item of a color printing process.

The area for setting a resolution includes a setting item for designating print at high resolution and a setting item for designating print at low resolution. The two setting items included in the area for setting a resolution are associated with mutually contradictory processes. This allows designation of any one of two setting items included in the area for setting a resolution. An area for setting a priority level is arranged adjacent to each of the two setting items. A priority level is set in the area for setting a priority level, so that the process corresponding to the setting item having a priority level set and the priority level are defined as a transmission source process procedure. The figure exemplarily shows that Level 2 is set in the area for setting a priority level corresponding to the setting item of high resolution, so that the high-resolution printing process and the priority level "Level 2" are defined. When Level 2 is set in the area for setting a priority level corresponding to the setting item of high resolution, "no designation" is set in the area for setting a priority level corresponding to the setting item of low-resolution print.

The area for setting N-in-1 print includes a setting item of N-in-1 print (2 in 1) for designating a process of printing two pages in one sheet of paper, a setting item of N-in-1 (4 in 1) for designating a process of printing four pages in one sheet of paper, and a setting item of enlargement/reduction prohibited for designating prohibition of enlargement/reduction. The three setting items included in the area for setting N-in-1 print are associated with mutually contradictory processes. This allows designation of any one of three setting items included in the area for setting N-in-1 print. An area for setting a priority level is arranged adjacent to each of the three setting items. A level is set in the area for setting a priority level, so that the process corresponding to the setting item having the level set and the priority level are defined as a transmission source process procedure. The figure exemplarily shows that Level 3 is set in the area for setting a priority level corresponding to the setting item of N-in-1 print (2 in 1), so that N-in-1 print (2 in 1) process and the priority level "Level 3" are defined. When Level 3 is set in the area for setting a priority level corresponding to the setting item of N-in-1 print (2 in 1), "no designation" is set in all of the areas for setting a priority level corresponding to the two setting items excluding N-in-1 print (2 in 1).

The area for setting a paper size includes a setting item of paper size designation (A3) for designating A3 size paper and a setting item of paper size designation (A4) for designating A4 size paper. The two setting items included in the area for designating a paper size are associated with mutually contradictory processes. This allows designation of any one of two setting items included in the area for setting a paper size. An area for setting a priority level is arranged adjacent to each of the two setting items. A level is set in the area for setting a priority level, so that the process corresponding to the setting item having the level set and the priority level are defined as a transmission source process procedure. The figure exemplarily shows that Level 1 is set in the area for setting a priority level corresponding to the setting item of paper size designation (A4), so that a process of feeding A4 size paper for image formation and the priority level "Level" 1 are defined. When Level 1 is set in the area for setting a priority level corresponding to the setting item of paper size designation (A4), "no designation" is set in the area for setting a priority level corresponding to the setting item of paper size designation (A3).

The area for setting toner save printing includes a setting item of toner save printing and an area arranged adjacent thereto for setting a priority level. A level is set in the area for setting a priority level, so that whether printing is done in a toner save mode and, if it is done, the priority level are defined as a transmission source process procedure. The figure exemplarily shows that "no designation" is set in the area for setting a priority corresponding to the setting item of toner save printing, so that printing without a toner save mode is defined.

The area for setting double-sided printing includes a setting item of double-sided printing and an area arranged adjacent thereto for setting a priority level. A level is set in the area for setting a priority level, so that whether or not printing is done on both sides of paper and, if it is done, the priority level are defined as a transmission source process procedure. The figure exemplarily shows that "no designation" is set in the area for setting a priority level corresponding to the setting item of double-sided printing, so that it is defined that printing is not done on both sides of paper.

The area for setting a security-related printing process includes an area for setting confidential printing, an area for setting watermark printing, an area for setting data processing after image formation, an area for setting whether encrypted or not, and an area for setting data transfer.

The area for setting confidential printing includes a setting item of confidential printing and an area arranged adjacent thereto for setting a priority level. A level is set in the area for setting a priority level, so that whether or not confidential printing is done and, if it is done, the priority level are defined as a transmission source process procedure. The confidential printing refers to a process of performing image formation on print data on condition that a password related thereto is input. The figure exemplarily shows that "no designation" is set in the area for setting a priority level corresponding to the setting item of confidential printing, so that it is defined that confidential printing is not done.

The area for setting watermark printing includes a setting item of watermark printing and an area arranged adjacent thereto for setting a priority level. A level is set in the area for setting a priority level, so that whether or not watermark printing is done and, if it is done, the priority level are defined as a transmission source process procedure. The watermark printing refers to a process of performing image formation on data including print data combined with a watermark. The figure exemplarily shows that "no designation" is set in the area for setting a priority level corresponding to the setting item of watermark printing, so that it is defined that watermark printing is not done.

The area for setting data processing after image formation includes a setting item of data deletion after printing for designating that data is to be deleted after printing, and a setting item of data saving after printing for designating that data is to be saved after printing. The two setting items included in the area for setting data processing after image formation are associated with mutually contradictory processes. This allows designation of any one of two setting items included in the area for setting data processing after image formation. An area for setting a priority level is arranged adjacent to each of the two setting items. A level is set in the area for setting a priority level, so that the process corresponding to the setting item having the level set and the priority level are defined as a transmission source process procedure. The figure exemplarily shows that Level 2 is set in the area for setting a priority level corresponding to the setting item of data saving after printing, so that the process of saving print data after printing and the priority level "Level 2" are defined. When Level 2 is set in the area for setting a priority level corresponding to the setting item of data saving after printing, "no designation" is set in the area for setting a priority level corresponding to the setting item of data deletion after printing.

The area for setting encryption includes a setting item of encryption and an area arranged thereto for setting a priority level. A level is set in the area for setting a priority level, so that whether or not print data is to be encrypted, and if it is, the priority level are defined as a transmission source process procedure. The encryption refers to a process of encrypting print data. The figure exemplarily shows that "no designation" is set in the area for setting a priority level corresponding to the setting item of encryption, so that no encryption is defined.

The area for setting data transfer includes a setting item of transfer (mail) for designating a process of transferring print data via email, a setting item of transfer prohibited for designating prohibition of a process of transferring print data via email, a setting item of transfer (FTP) for designating a process of transferring print data via FTP (File Transfer Protocol), a setting item of transfer prohibited (FTP) for designating prohibition of a process of transferring print data via FTP, a setting item of transfer (SMB) for designating a process of transferring print data via SMB (Server Message Block), and a setting item of transfer prohibited for designating prohibition of a process of transferring print data via SMB.

The setting item of transfer (mail) and the setting item of transfer prohibited (mail) are associated with mutually contradictory processes. This allows designation of any one of the setting item of transfer (mail) and the setting item of transfer prohibited (mail). An area for setting a priority level is arranged adjacent to each of the two setting items. A level is set in the area for setting a priority level, so that the process corresponding to the setting item having the level set and the priority level are defined as a transmission source process procedure. In the figure, "no designation" is set in the area for setting a priority level corresponding to each of the two setting items. Therefore, in this example, neither a process of transferring print data via email nor prohibition of a process of transferring print data via email is defined.

The setting item of transfer (FTP) and the setting item of transfer prohibited (FTP) are associated with mutually contradictory processes. This allows designation of any one of the setting item of transfer (FTP) and the setting item of transfer prohibited (FTP). An area for setting a priority level is arranged adjacent to each of the two setting items. A level is set in the area for setting a priority level, so that the process corresponding to the setting item having the level set and the priority level are defined as a transmission source process procedure. In the figure, "no designation" is set in the area for setting a priority level corresponding to each of the two setting items. Therefore, in this example, neither a process of transferring print data via FTP nor prohibition of a process of transferring print data via FTP is defined.

The setting item of transfer (SMB) and the setting item of transfer prohibited (SMB) are associated with mutually contradictory processes. This allows designation of any one of the setting item of transfer (SMB) and the setting item of transfer prohibited (SMB). An area for setting a priority level is arranged adjacent to each of the two setting items. A level is set in the area for setting a priority level, so that the process corresponding to the setting item having the level set and the priority level are defined as a transmission source process procedure. In the figure, "no designation" is set in the area for setting a priority level corresponding to each of the two setting items. Therefore, in this example, neither a process of transferring print data via SMB nor prohibition of a process of transferring print data via SMB is defined.

<BOX Transmission and Reception>

In data processing system 1 according to this embodiment, the above-described job setting process is executed when a job input process is executed at a job input terminal. Then, a job management process is executed in the home terminal of the destination user set by the job setting process. Here, the user of the user identification information "David" transmits image data to the destination of user identification information "Julie" at home terminal MFP 100 so that the job input process is executed in MFP 100 and the job management process is executed in MFP 100A which is the home terminal of the user identification information "Julie." Furthermore, when "Julie" who is set to be the destination user gives an instruction to output the job at home terminal MFP 100A or at other terminals MFPs 100, 100B, and 100C, a job output process is executed at that terminal. The terminal instructed to output a job is called a job output terminal. Here, the job output terminal is MFP 100B.

Figure 8:
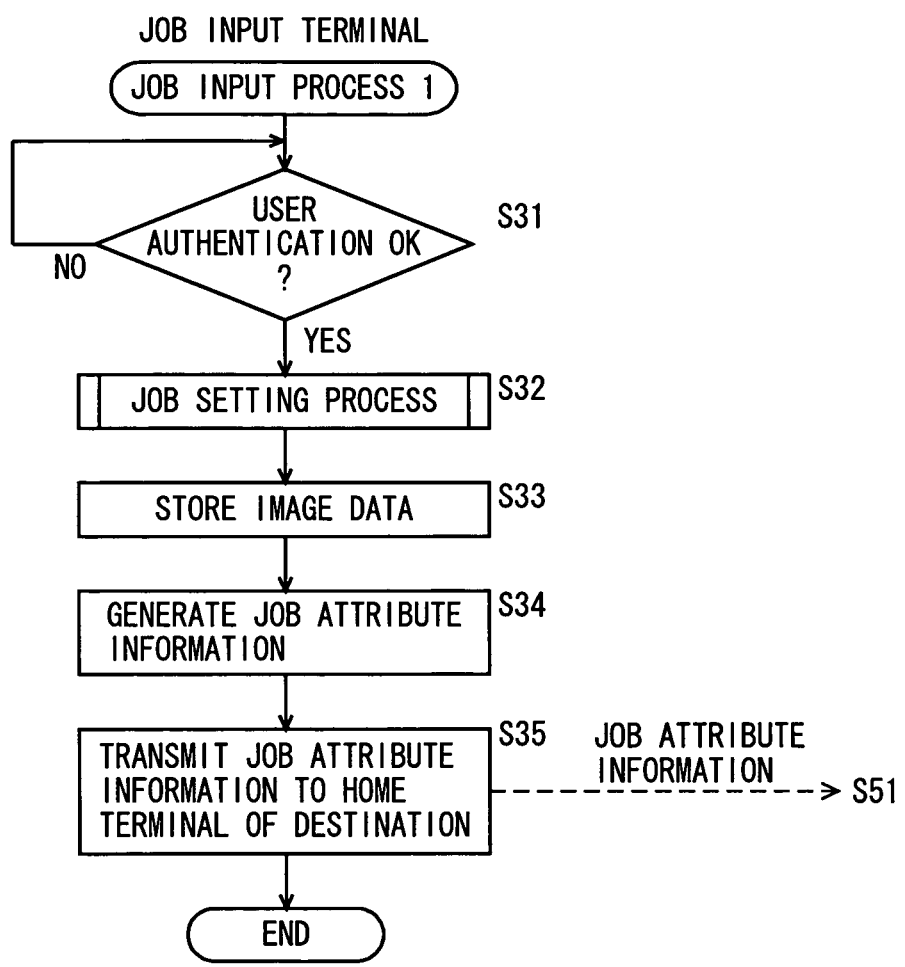
FIG. 8 is a flowchart illustrating a flow of a job input process performed at a job input terminal.

FIG. 8 is a flowchart illustrating an exemplary flow of a job input process executed in the job input terminal. This job input process is implemented by loading a job input program stored in flash memory 108 into RAM 105 of the job input terminal and executing the job input program by CPU 101. The job input program is a part of a data processing program.

With reference to FIG. 8, MFP 100 which is the job input terminal performs user authentication of the user with user identification information "David" (step S31). As a result of the user authentication, if the authentication is successful, log-in is permitted and the process proceeds to step S32, but if the authentication is failed, log-in is not permitted and the process goes back to step S31 and enters the stand-by state. MFP 100 permits log-in when the user identification information and a password input by the user exist in the user data stored in HDD 107, while MFP 100 does not permit log-in when they do not exist. As described above, the user data includes registered user information stored in MFPs 100A, 100B, and 100C other than MFP 100, so that a user for whom MFP 100 is not a home terminal can log into MFP 100 as long as the user uses any of MFPs 100A, 100B, and 100C as a home terminal.

In step S32, the job setting process described using FIG. 5 is executed. Then, upon completion of job setting, the process proceeds to step S33. As a result of completion of job setting, image data to be transmitted, a destination, and a transmission source process procedure are decided.

In step S33, image data decided to be transmitted is stored in HDD 107. Then, in step S34, job attribute information is generated. The job attribute information generated in step S34 includes apparatus identification information of MFP 100 in location information of image data since the image data is stored in HDD 107 of MFP 100. Then, the generated job attribute information is transmitted to MFP 100A which is the home terminal of the destination user "Julie" (step S35).

As a result of execution of the job input process, image data designated as image data to be transmitted by the user in the job setting process is stored in MFP 100 which is a job input terminal, and the job attribute information is stored in MFP 100A which is the home terminal of "Julie."

FIG. 9 is a diagram showing an example of a format of job attribute information. With reference to FIG. 9, the job attribute information includes information of transmission source, destination information, image data information, and a transmission source process procedure. The information of transmission source is user identification information of a user who gives an instruction to execute the job input process, who is, here, "David." The destination information includes user identification information of the destination user and apparatus identification information for identifying the home terminal of that user. Here, the user identification information of the destination information is "Julie" and the apparatus identification information is the IP address of MFP 100A. The image data information includes the apparatus identification information of a terminal in which the image data information is stored and a file name stored in that terminal. Here, the image data is stored in HDD 107 of MFP 100 which is the job input terminal, so that in the job attribute information generated in step S34 in FIG. 8, the apparatus identification information of the image data information is the IP address of MFP 100 and the file name is designated by a direct path including information which specifies HDD 107 (for instance, a device name or a drive name). The image data information can be an URL (Uniform Resource Locator). The transmission source process procedure includes a normal printing process and a security-related printing process, defines a plurality of processes in normal printing and a priority level of each process, and defines a plurality of processes in security-related printing and a priority level of each process.

Figure 10:
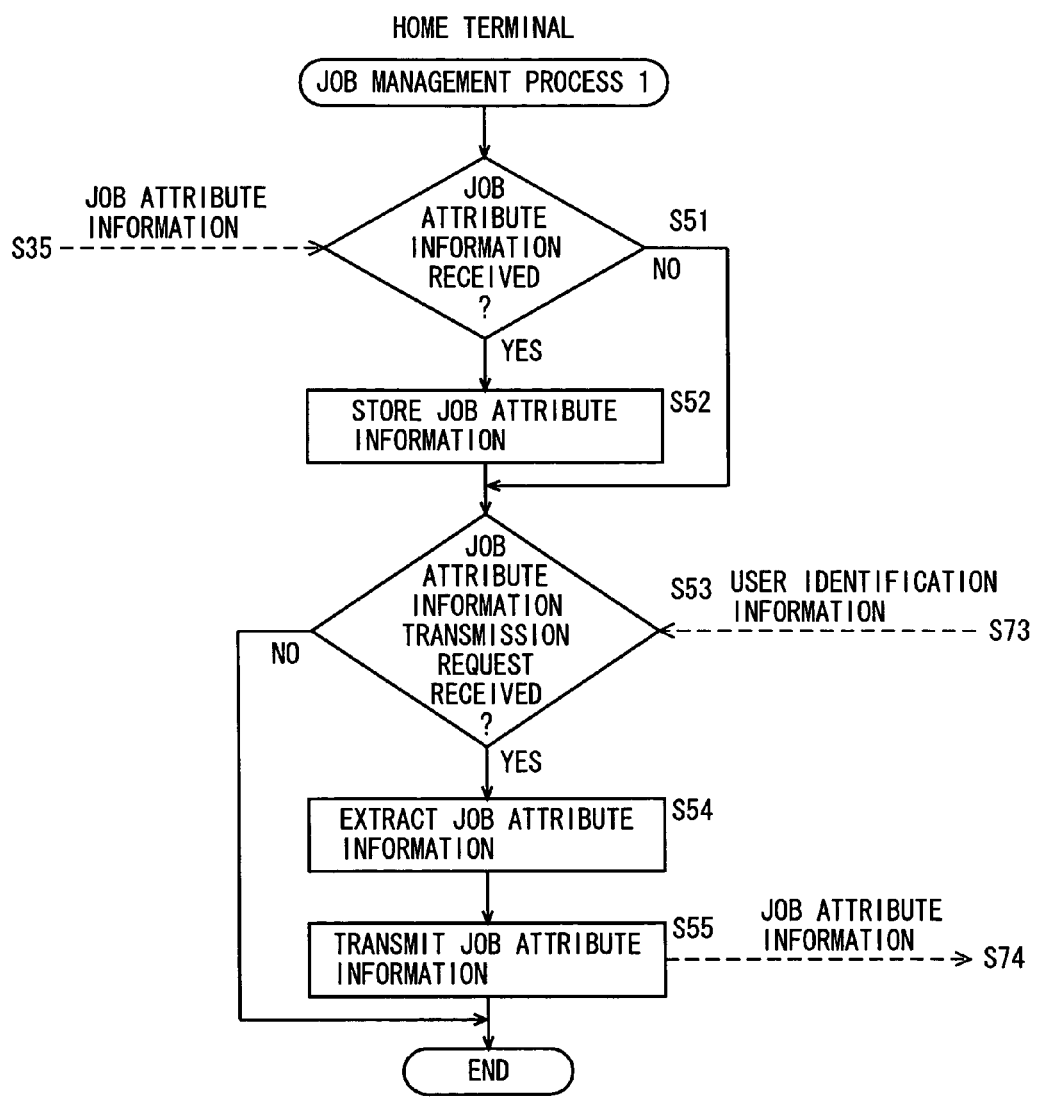
FIG. 10 is a flowchart illustrating an exemplary flow of a job management process performed at a home terminal.
Figure 11:
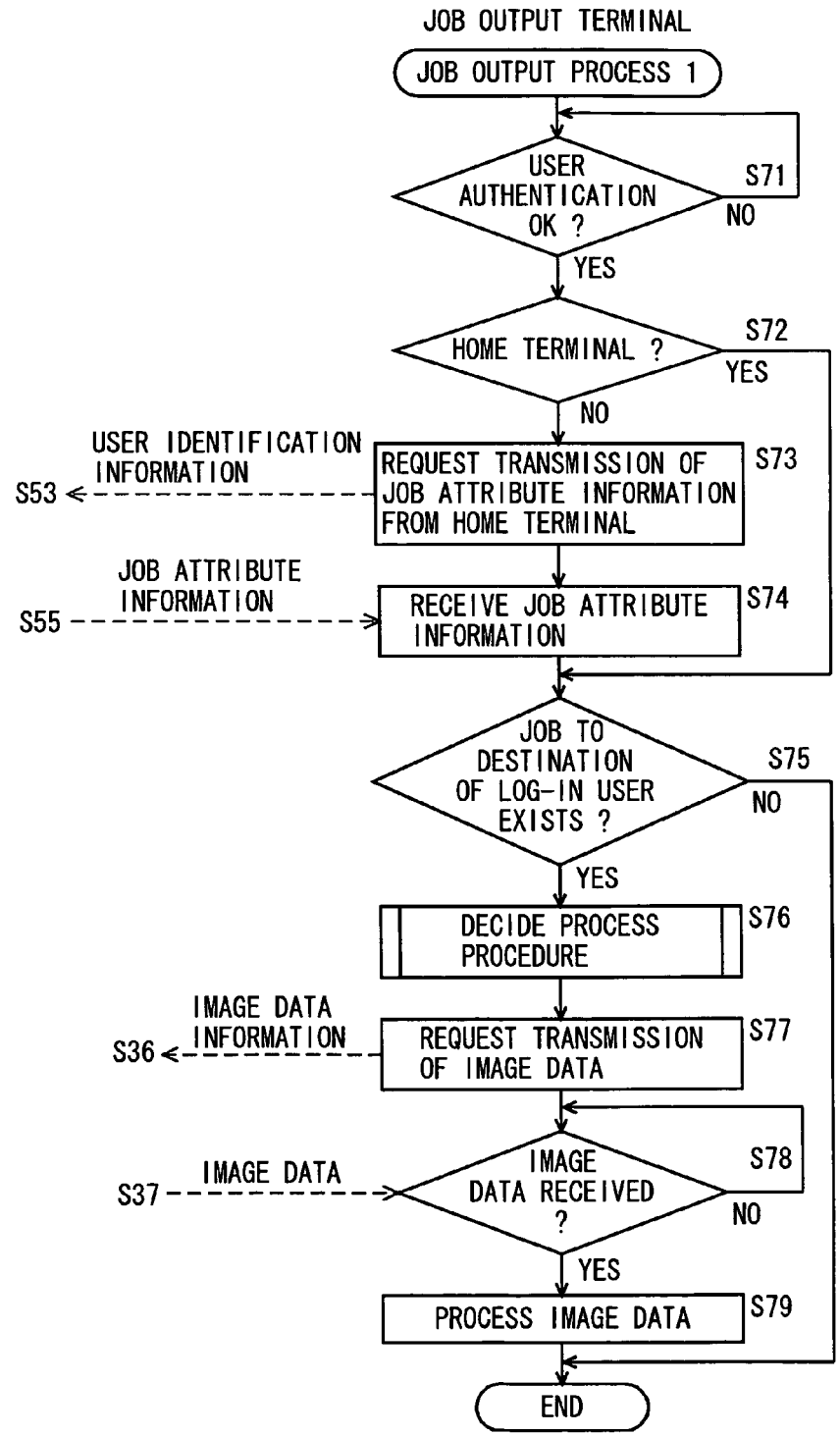
FIG. 11 is a first flowchart illustrating an exemplary flow of a job output process performed at a job output terminal.

FIG. 10 is a flowchart illustrating an exemplary flow of a job management process executed at a home terminal. The job management process is implemented by loading a data processing program stored in flash memory 108 into RAM 105 of the home terminal and executing the data processing program by CPU 101. FIG. 11 is a first flowchart illustrating an exemplary flow of a job output process executed at a job output terminal. This job output process is implemented by loading a data processing program stored in flash memory 108 into RAM 105 of the job output terminal and executing the data processing program by CPU 101.

With reference to FIG. 10, MFP 100A as a home terminal determines whether or not job attribute information is received (step S51). If the job attribute information is received, the process proceeds to step S52, and if the job attribute information is not received, the process proceeds to step S53. In step S52, the received job attribute information is stored in a prescribed area of HDD 107.

Next, with reference to FIG. 11, MFP 100B as a job output terminal performs user authentication of the user of the user identification information "Julie" (step S71). As a result of the user authentication, if authentication is successful, log-in is permitted and the process proceeds to step S72, but if authentication is not successful, log-in is not permitted and the process enters the stand-by state. In other words, the job output process is a process which is executed on condition that at least user identification information is input at the job output terminal. As described above, user data includes registered user information stored in MFPs 100, 100A, and 100C other than MFP 100B which is the home terminal, so that a user for whom MFP 100B is not a home terminal can log into MFP 100B as long as the user uses any of MFPs 100, 100A, and 100C as a home terminal.

Thus, in step S72, it is determined whether or not MFP 100B which is the job output terminal is the home terminal of the user of the user identification information "Julie." If it is the home terminal, the process proceeds to step S75, but if not, the process proceeds to step S73. Here, MFP 100B is not the home terminal of the user of the user identification information "Julie" so that the process proceeds to step S73. In step S73, a request for transmission of job attribute information is transmitted to MFP 100A which is the home terminal of the user of the user identification information "Julie." This transmission request includes the user identification information "Julie."

With reference to FIG. 10, in step S53, it is determined whether the transmission request for the job attribute information is received or not. If it is received, the process proceeds to step S54, and if it is not received, the process is ended. In step S54, using the user identification information included in the transmission request, the job attribute information including that user identification information is extracted from the job attribute information stored in HDD 107. In the case where a plurality of corresponding job attribute information exist in HDD 107, all of the corresponding job attribute information is extracted. Then, the extracted job attribute information is transmitted to the job output terminal that transmitted the transmission request (step S55). Moreover, if no corresponding job attribute information is extracted in step S54, information which indicates that the job attribute information does not exist is transmitted to the job output terminal.

With reference to FIG. 11, job attribute information is received according to the transmission request transmitted in step S73 (step S74). If the information which indicates that the job attribute information does not exist is received, the process proceeds directly to step S75.

In the next step S75, it is determined whether or not a job whose destination is the user of the user identification information "Julie" who is the log-in user exists. This determination is made based on whether or not the job attribute information exists. If the job output terminal is not a home terminal, the determination is made based on whether or not the information which indicates that the job attribute information does not exist is received in step S74. If such information is received, the process is ended as having no job. If the job attribute information is received in step S74, the process proceeds to step S76. On the other hand, in the case where the job output terminal is a home terminal, job attribute information which includes the user identification information "Julie" who is the log-in user is extracted from the job attribute information stored in HDD 107. If such job attribute information is extracted, the process proceeds to step S76 as having a job, and if it is not extracted, the process is ended.

In step S76, a process procedure decision process is performed. The process procedure decision process, which will be described later, is a process of deciding a final process procedure by making a comparison between a transmission source process procedure included in the job attribute information specified in step S75 and a transmission destination process procedure of the log-in user.

In the next step S77, a transmission request for image data specified by image data information included in the job attribute information specified in step S75 is transmitted to MFP 100 as a job input terminal. Then, the stand-by state continues until image data transmitted from MFP 100 in response to a transmission request is received (NO in step S78). When image data is received (YES in step S78), the process proceeds to step S79. In step S79, the received image data is processed according to the process procedure decided in step S76.

It is noted that a job output terminal may also serve as a job input terminal. In such a case, image data is stored in HDD 107 of the job output terminal. Therefore, when such image data is obtained, the job output terminal reads image data specified by a file name of image data information of job attribute information from HDD 107, in place of transmitting a transmission request for image data in step S77. In this case, step S78 is not necessary. Such image data exchange in the same terminal is also referred to as image data transmission and/or image data reception.

Figure 12:
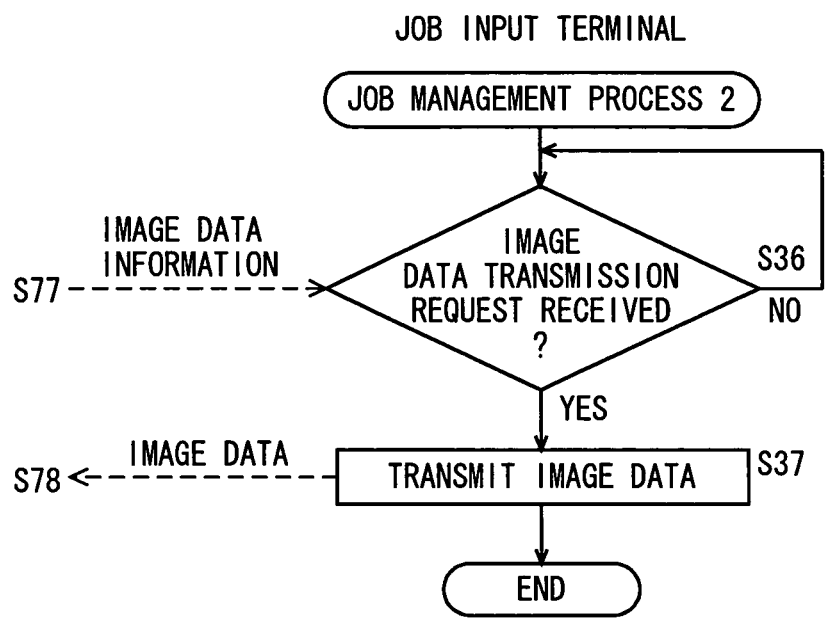
FIG. 12 is a flowchart illustrating an exemplary flow of a job management process performed at a home terminal.

FIG. 12 is a flowchart illustrating an exemplary flow of a job management process executed at a home terminal. This job management process is implemented by loading a job management program stored in flash memory 108 into RAM 105 of the home terminal and executing the job management program by CPU 101. The job management program is a part of a data processing program.

With reference to FIG. 12, in step S36, it is determined whether or not a transmission request for image data is received. If a transmission request is received, the process proceeds to step S37, and if not received, the process ends. In step S37, image data specified by a file name included in the received transmission request is read. Then, the read image data is transmitted to MFP 100B as a job output terminal which transmitted a transmission request (step S37), and the process ends. If MFP 100 has transmitted image data, the image data is deleted from HDD 107. This prevents image data from staying stored in HDD 107.

Figure 13:
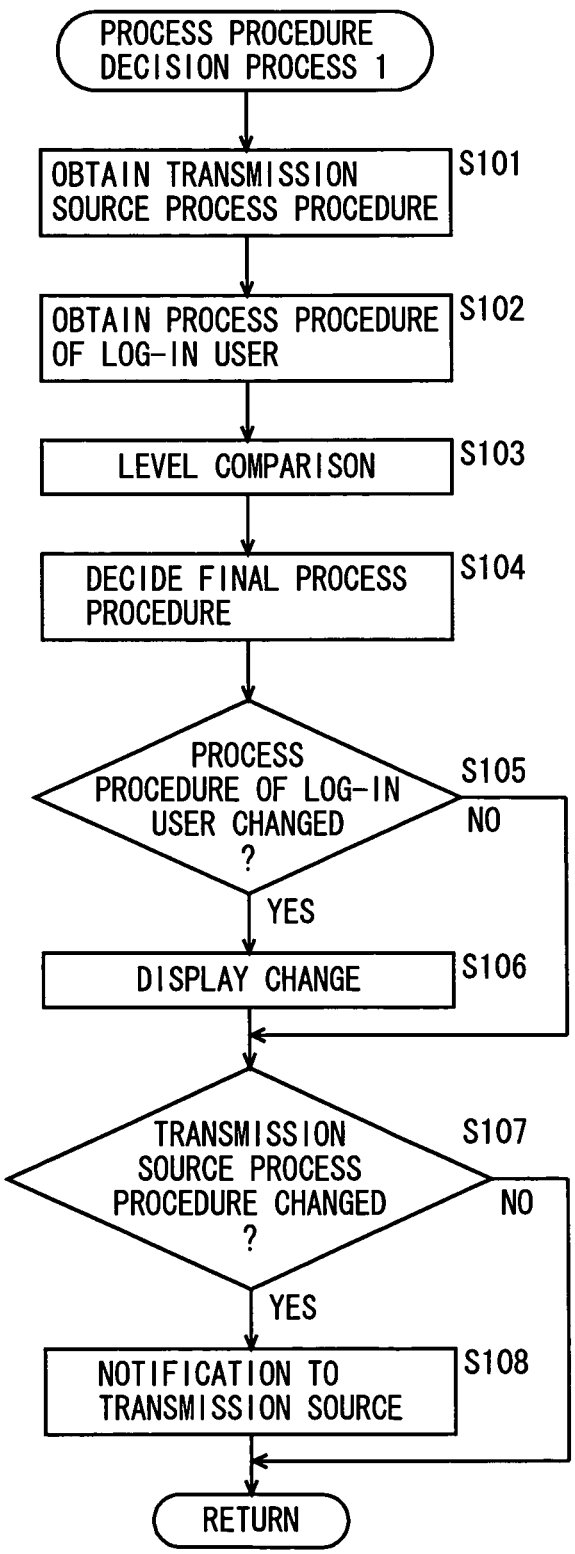
FIG. 13 is a first flowchart illustrating an exemplary flow of a process procedure decision process.

FIG. 13 is a first flowchart illustrating an exemplary flow of a process procedure decision process. The process procedure decision process is a process executed in step S76 of FIG. 11. With reference to FIG. 13, MFP 100B as a job output terminal first obtains a transmission source process procedure (step S101). Specifically, the transmission source process procedure included in the job attribute information specified in step S75 of FIG. 11 is obtained. Then, the process procedure of the log-in user is obtained (step S102). Specifically, the registered user information related with the user identification information of the log-in user is obtained, so that the transmission destination process procedure included in the registered user information is obtained as a process procedure of the log-in user. If the job output terminal MFP 100B is the home terminal of the log-in user, the registered user information is read from HDD 107 since the registered user information including the user identification information of the log-in user is stored in HDD of MFP 100B. If the job output terminal MFP 100B is not the home terminal of the log-in user, the process procedure of the log-in user is obtained by requesting the home terminal of the log-in user to transmit the registered user information including the user identification information of the log-in user and then receiving the registered user information including the user identification information of the log-in user.

In the next step S103, a level comparison is made. Specifically, the transmission source process procedure obtained in step S101 and the process procedure of the log-in user (transmission destination process procedure) obtained in step S102 are compared with each other in priority level for each contradictory process. Then, in the next step S104, a process with a higher priority level is selected and the final process procedure is then decided. If the priority levels are the same, either of the process defined by the transmission source process procedure and the process defined by the transmission destination process procedure is selected according to a predetermined rule.

A specific example of a predetermined rule is as follows.

(1) For the security-related printing process, a process with heavier security has a higher priority. For the normal printing process, a transmission destination process procedure has a higher priority. In the data processing after image formation, a process of deleting data after printing is given heavier security than a process of saving data after printing. Prohibition of a process of transferring print data via email, FTP or SMB is given heavier security than a process of transferring print data via email, FTP or SMB.

(2) For the security-related printing process, a process with heavier security has a higher priority. For the normal printing process, a transmission source process procedure has a higher priority.

(3) For all the processes, a transmission destination process procedure has a higher priority.

(4) For all the processes, a transmission source process procedure has a higher priority.

(5) For a particular process, a transmission destination process procedure has a higher priority, and for the other processes, a transmission source process procedure has a higher priority. A particular process is a predetermined process.

(6) For a particular process, a transmission source process procedure has a higher priority, and for the other processes, a transmission destination process procedure has a higher priority. A particular process is a predetermined process.

In step S105, it is determined whether or not the transmission destination process procedure that is the process procedure of the log-in user is changed. If a changed process exists, the process proceeds to step S106. If a changed process does not exist, step S106 is skipped and the process proceeds to step S107. Specifically, the final process procedure and the transmission destination process procedure are compared with each other, and if any different process exists, that process is determined as a changed process. In step S106, the changed process in the transmission destination process procedure is displayed on display portion 119B in order to notify the log-in user that the transmission destination process procedure is changed. Thus, the log-in user becomes aware that data is subjected to image formation for output according to the process procedure different from the process procedure set by himself.

In step S107, it is determined whether or not the transmission source process procedure is changed. If a changed process exists, the process proceeds to step S108. If a changed process does not exist, step S108 is skipped and the process goes back to the job output process. Specifically, the final process procedure and the transmission source process procedure are compared with each other, and if any different process exits, that process is determined as a changed process. In step S108, the transmission source user is notified of the changed process in the transmission destination process procedure. Since the user of the user identification information included in the job attribute information specified in step S75 of FIG. 11 is the transmission source user, user data including the user identification information included in the job attribute information is extracted, and an email is transmitted to the email address included in the extracted user data. The email at least includes information for identifying the changed process in the transmission source process procedure. Thus, the transmission source user who sets the job can be aware that data is subjected to image formation for output according to the process procedure different from the process procedure set by himself. Alternatively, information for identifying image data may be included in the email. The transmission source user who sets a plurality of jobs can specify any of them. It is noted that transmission may be via FTP or facsimile in place of emails.

<Modified BOX Transmission and Reception>

A modified BOX transmission and reception will now be described. In data processing system 1 described above, when MFP 100 is newly connected to network 2 in the state where MFPs 100A, 100B, 100C have already been connected to network 2, an initial setting process shown in FIG. 3A is executed in MFP 100 and the connection process shown in FIG. 3B is executed in other MFPs 100A, 100B, 100C. In data processing system 1 in the modification, each process is performed similarly so that the first or second user data is generated in MFPs 100, 100A, 100B, 100C. However, the first or second user data generated in data processing system 1 in accordance with the modification does not require terminal identification information for identifying a home terminal.

FIGS. 14A and 14B are other flowcharts illustrating an exemplary flow of a process executed when MFP 100 is newly connected to the network. FIG. 14A shows another flow of an initial setting process executed in MFP 100, and FIG. 14B shows another flow of a connection process executed in each of MFPs 100A, 100B, 100C when an initial setting process is executed in MFP 100. The initial setting process and the connection process are implemented by loading the initial setting program and the connection program stored in flash memory 108 into RAM 105 and executing these programs by CPU 101, respectively. The initial setting program and the connection program are part of a data processing program.

With reference to FIG. 14A, this initial setting process is different from that shown in FIG. 3A in that registered user information is transmitted without transmission of terminal information in step S04A while terminal information and registered user information are transmitted in step S04, and in that registered user information is received without reception of terminal information in step S05A while terminal information and registered user information are received in step S05. Furthermore, with reference to FIG. 14B, this connection process is different from that shown in FIG. 3B in that registered user information is received without reception of terminal information in step S11A while terminal information and registered user information are received in step S11, and in that registered user information is transmitted without transmission of terminal information in step S12A while terminal information and registered user information are transmitted in step S12. Therefore, MFP 100 generates user data based on the registered user information. This user data includes registered user information.

If it is determined in step S07 that the registered user information of the apparatus itself is used, all the registered user information stored in MFPs 100, 100A, 100B, 100C is put together to form user data (first user data). If it is determined in step S07 that the registered user information of the apparatus itself is not used, all of the terminal information and the registered user information of MFP 100A, 100B, 100C excluding MFP 100 is put together to form user data (second user data). Then, the generated user data is stored in HDD 107.

Furthermore, in each of MFPs 100A, 100B, 100C, user data is generated based on the registered user information of MFP 100 received in step S11A, and the generated user data is added to the user data already stored in HDD 107 (step S13).

FIG. 15A is another diagram showing an example of first user data. FIG. 15B is another diagram showing an example of second user data. FIGS. 15A and 15B show user data generated when the registered user information shown in FIGS. 4A to 4D is stored in each of MFPs 100, 100A, 100B, 100C. With reference to FIGS. 15A and 15B, the first and second user data differ from the first and second user data shown in FIGS. 4E and 4F in that information concerning a home terminal is not included.

Here, for the sake of brevity, the user of the user identification information "David" inputs a job to transmit image data to the destination of the user identification information "Julie", by way of example. In this case, a job input process is executed in MFP 100. In the job input process, after user authentication in response to a log-in request from the user "David", a job setting process is performed. It is noted that although here the job input process is executed at a home terminal by way of example, the job input process may be executed at a terminal other than a home terminal.

Figure 16:
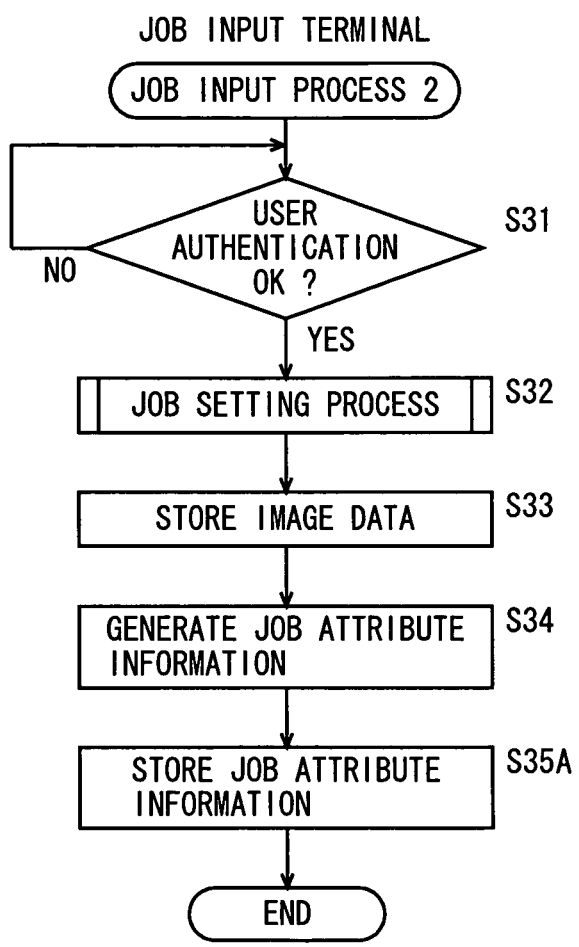
FIG. 16 is another flowchart illustrating an exemplary flow of a job input process performed at a job input terminal.
Figure 17:
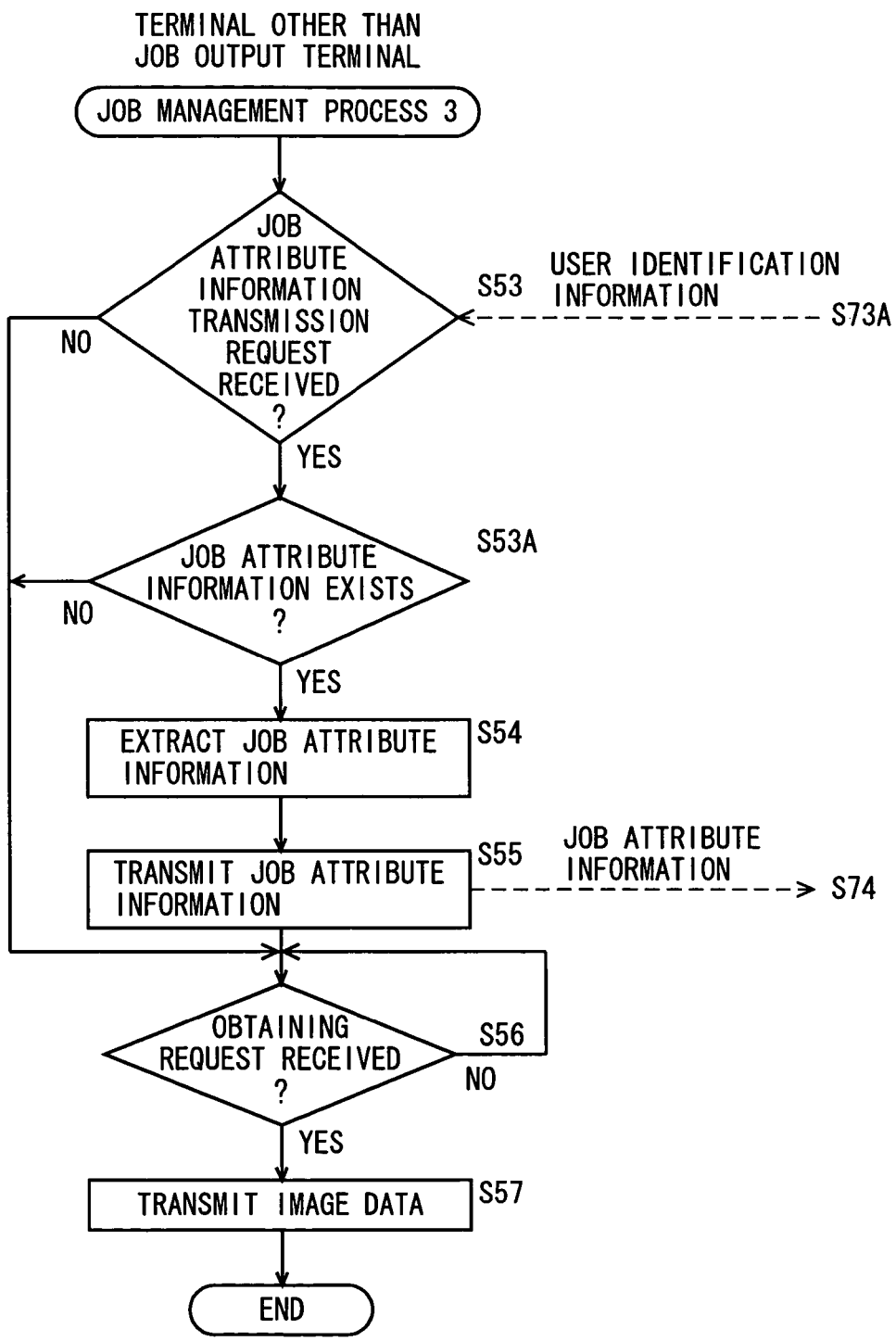
FIG. 17 is another flowchart illustrating a flow of a job management process performed at a terminal other than a job output terminal.
Figure 18:
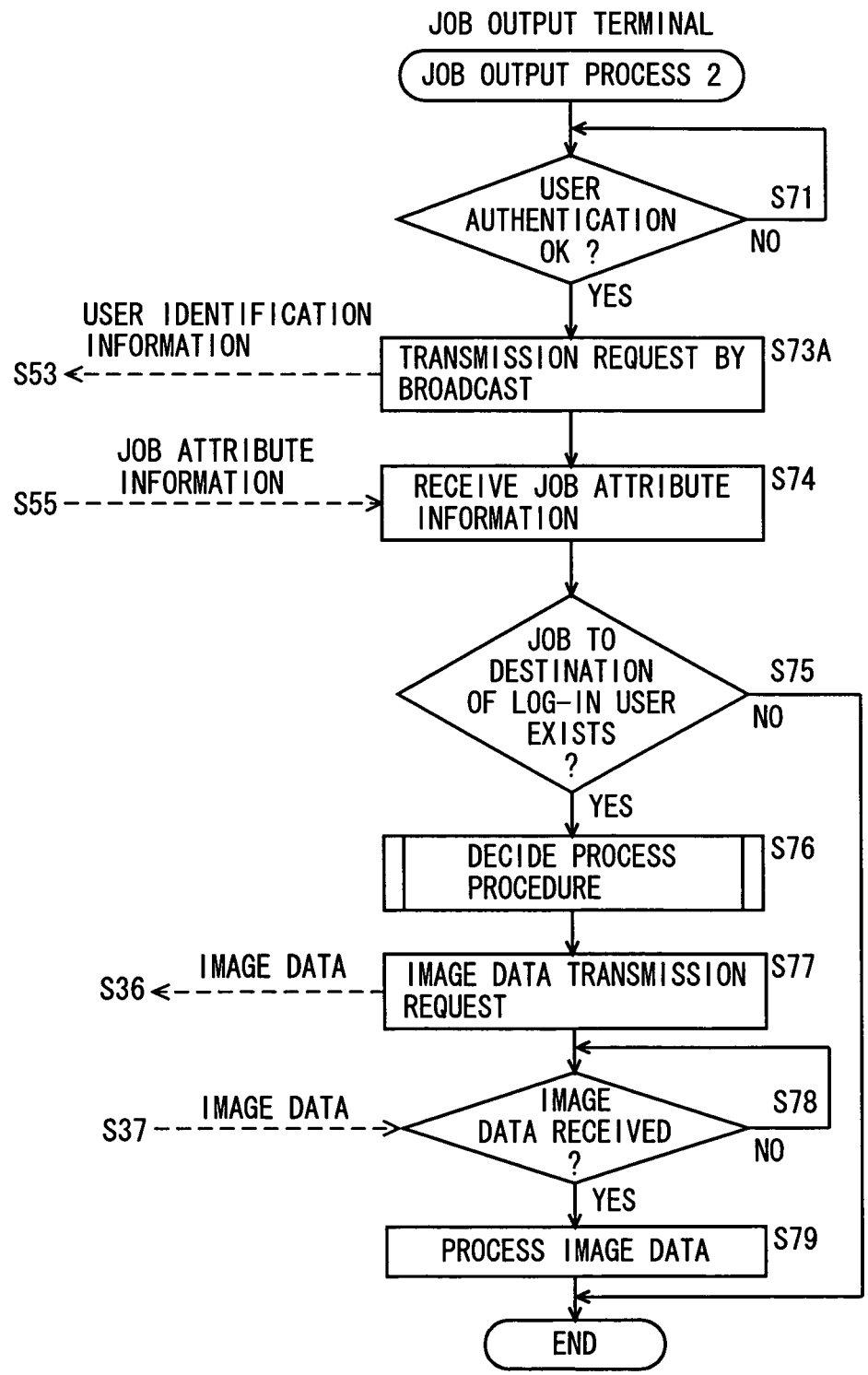
FIG. 18 is a second flowchart illustrating a flow of a job output process performed at a job output terminal.

FIG. 16 is another flowchart illustrating an exemplary flow of a job input process executed at a job input terminal. FIG. 17 is another flowchart illustrating a flow of a job management process executed at a terminal other than a job output terminal. FIG. 18 is a second flowchart illustrating a flow of a job output process executed at a job output terminal. Referring to FIG. 16, this job input process differs from that shown in FIG. 8 in that step S35 is modified to step S35A. In data processing system 1 in the modified BOX transmission, as shown in FIG. 15A and FIG. 15B, the first and second user data does not include information concerning a home terminal. Therefore, the job attribute information generated in step S34 is stored in MFP 100 as a job input terminal without being transmitted to a home terminal. Furthermore, it is needless to say that the job attribute information does not include apparatus identification information of a home terminal in destination information, unlike the job attribute information shown in FIG. 9.

Now, an output of image data will be described. Here, the user of the user identification information "Julie" logs in MPF 100B, by way of example. In this case, MFP 100B corresponds to a job output terminal.

With reference to FIG. 18, in MFP 100B which is the job output terminal, user authentication of the user of the user identification information "Julie" is performed (step S71). As a result of the user authentication, if the user is authenticated, log-in is permitted and the process proceeds to step S73A, but if not authenticated, log-in is not permitted and the process enters the stand-by state. In other words, a job output process is a process which is executed on condition that at least user identification information is input at the job output terminal.

In step S73A, a signal requesting transmission of job attribute information including the user identification information "Julie" is transmitted by broadcast. This signal that requests the transmission of the job attribute information includes the user identification information "Julie."

With reference to FIG. 17, in step S53, it is determined whether or not the request for transmission of the job attribute information is received from the job output terminal. If it is received, the process proceeds to step S53A, and if it is not received, the process proceeds to step S56. In step S53A, it is determined whether or not the job attribute information including the user identification information included in the transmission request is stored in HDD 107. If such job attribute information is stored, the process proceeds to step S54, and if it is not stored, the process proceeds to step S56. In step S54, using the user identification information included in the transmission request, the job attribute information including that user identification information is extracted from the job attribute information stored in HDD 107. In the case where a plurality of corresponding job attribute information exist in HDD 107, all of the corresponding job attribute information is extracted. Then, the extracted job attribute information is transmitted to the job output terminal that transmitted the transmission request (step S55). Moreover, the processes in the following steps S56 and S57 are the same as the processes in steps S36 and S27 shown in FIG. 12, respectively, and therefore the description will not be repeated here.

Referring to FIG. 18 again, the job output terminal receives job attribute information in response to the transmission request transmitted in step S73A (step S74). The process in step S75 to step S79 executed at the job output terminal after reception of the job attribute information is the same as the process shown in FIG. 11, and therefore the description will not be repeated here.

In the modified BOX transmission, MFPs 100, 100A, 100B, 100C are allowed to execute the initial setting process shown in FIG. 14A and the connection process shown in FIG. 14B. However, these processes are not necessarily executed. In other words, in the data processing system in the modified BOX transmission, each of MFPs 100, 100A, 100B, 100C can execute the process shown in FIG. 16 to FIG. 18 even if the first user data or the second user data is not stored. In this case, in step S32 of FIG. 16, designation of image data to be transmitted, user identification information for specifying the destination user, and a transmission source process procedure are set. For this user identification information, registered user data needs not be stored in a job input terminal that executes the process at step S32, for example, MFP 100, and registered user data only has to be stored in any of MFPs 100, 100A, 100B, 100C.

As described above, data processing system 1 in the first embodiment is configured with MFPs 100, 100A, 100B, 100C each connected to a network. At the time of inputting image data, a job input terminal, for example, MFP 100 receives image data at scanner 113, FAX 117 or communication I/F 111, receives user identification information of a destination, and receives a transmission source process procedure, so that CPU 101 generates job attribute information in which information of a location of image data on the network, user identification information and a transmission source process procedure are related to one another, stores the image data in HDD 107 of MFP 100 as a job input terminal, and also transmits the job attribute information to the home terminal, which is here MFP 100A, of the user specified by the user identification information for storage. When the destination user logs in the job output terminal, which is here MFP 100B, the job attribute information including the user identification information allocated to that user and the transmission destination process procedure are obtained from the home terminal, which is here MFP 100B.

The final process procedure is decided based on the transmission source process procedure included in the job attribute information and the transmission destination process procedure of the log-in user, so that the image data specified by the image data information included in the job attribute information is processed according to the final process procedure. Therefore, a process procedure can be set at each of the sending side and the receiving side. In addition, when such processes are defined that are contradictory between a transmission source process procedure and a transmission destination process procedure, a process with a higher priority level is selected. Therefore, even if processes set at the sending side and the receiving side are mutually contradictory, either process can be decided on. Moreover, if the priority levels are the same, either of the process set at the sending side and the process set at the receiving side is selected according to a predetermined rule, thereby ensuring that the final process procedure can be decided. In addition, when a transmission source process procedure is changed, the user specified by the user identification information of the transmission source information included in job attribute information is notified of the changed process via email, so that the sender can be aware that image data is output in a process different from the process set by the sender himself. Furthermore, when a transmission destination process procedure is changed, the changed process is displayed on display portion 119B. Therefore, the user receiving image data can be aware that image data is output in a process procedure different from the process procedure set by himself.

Second Embodiment

The overall configuration of a data processing system in the second embodiment is similar to that of the data processing system in the first embodiment as shown in FIG. 1. Furthermore, the hardware configuration of MFPs 100, 100A, 100B, 100C which constitute the data processing system in the second embodiment is the same as that of MFP 100 shown in FIG. 2. Therefore, description thereof will not be repeated here. In the data processing system in the first embodiment, the final process procedure is decided by comparing a transmission source process procedure with a transmission destination process procedure at a job output terminal. In the data processing system in the second embodiment, a transmission source process procedure is decided with reference to a transmission destination process procedure at the stage in which a job is set at a job input terminal. In the following, a difference from the data processing system in the first embodiment will mainly be described.

Figure 19:
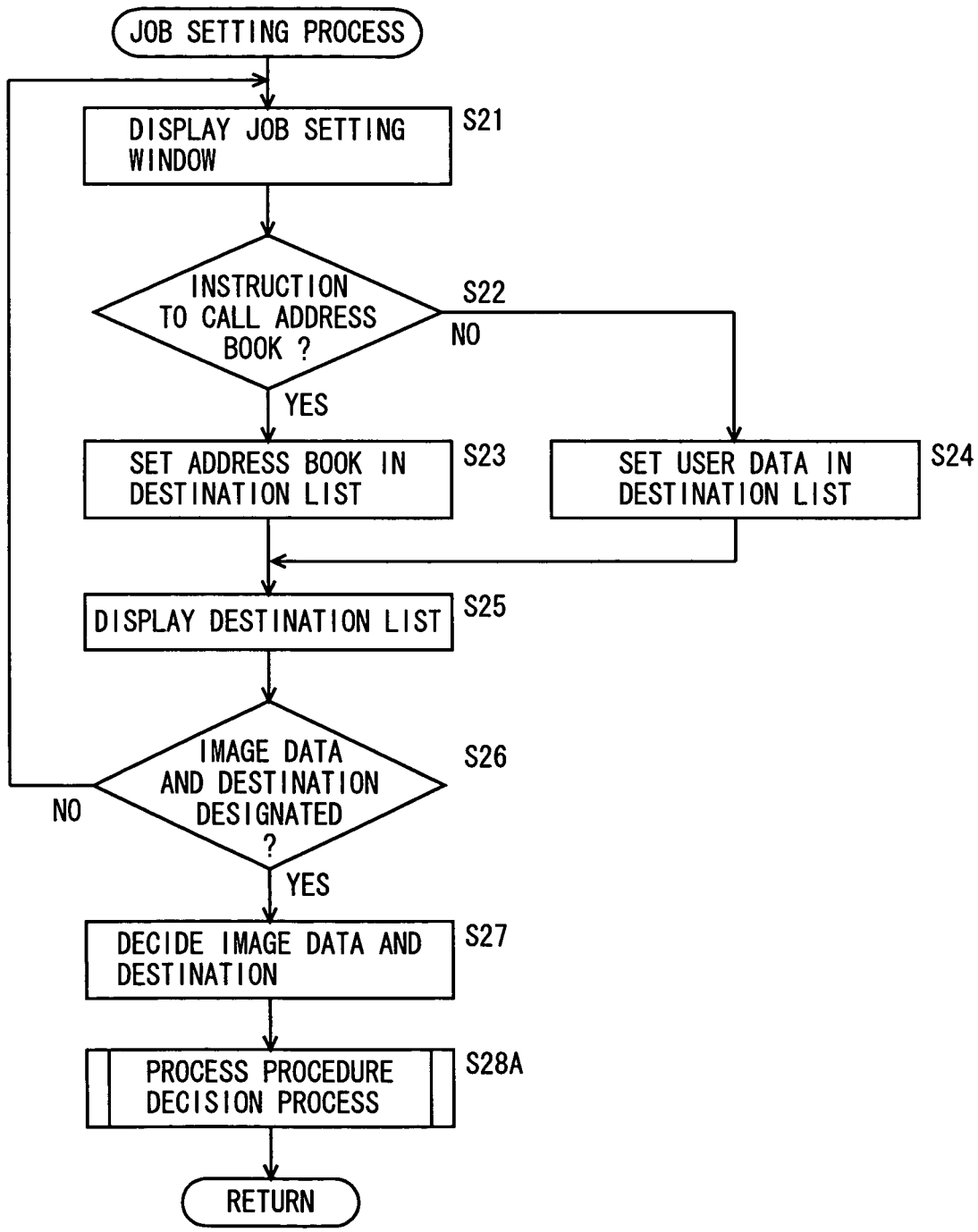
FIG. 19 is a flowchart illustrating an exemplary flow of a job setting process according to a second embodiment.

FIG. 19 is a flowchart illustrating an exemplary flow of a job setting process in the second embodiment. The job setting process differs from that shown in FIG. 5 in that step S28 is replaced by step S28A. In step S28A, a process procedure decision step is executed.

Figure 20:
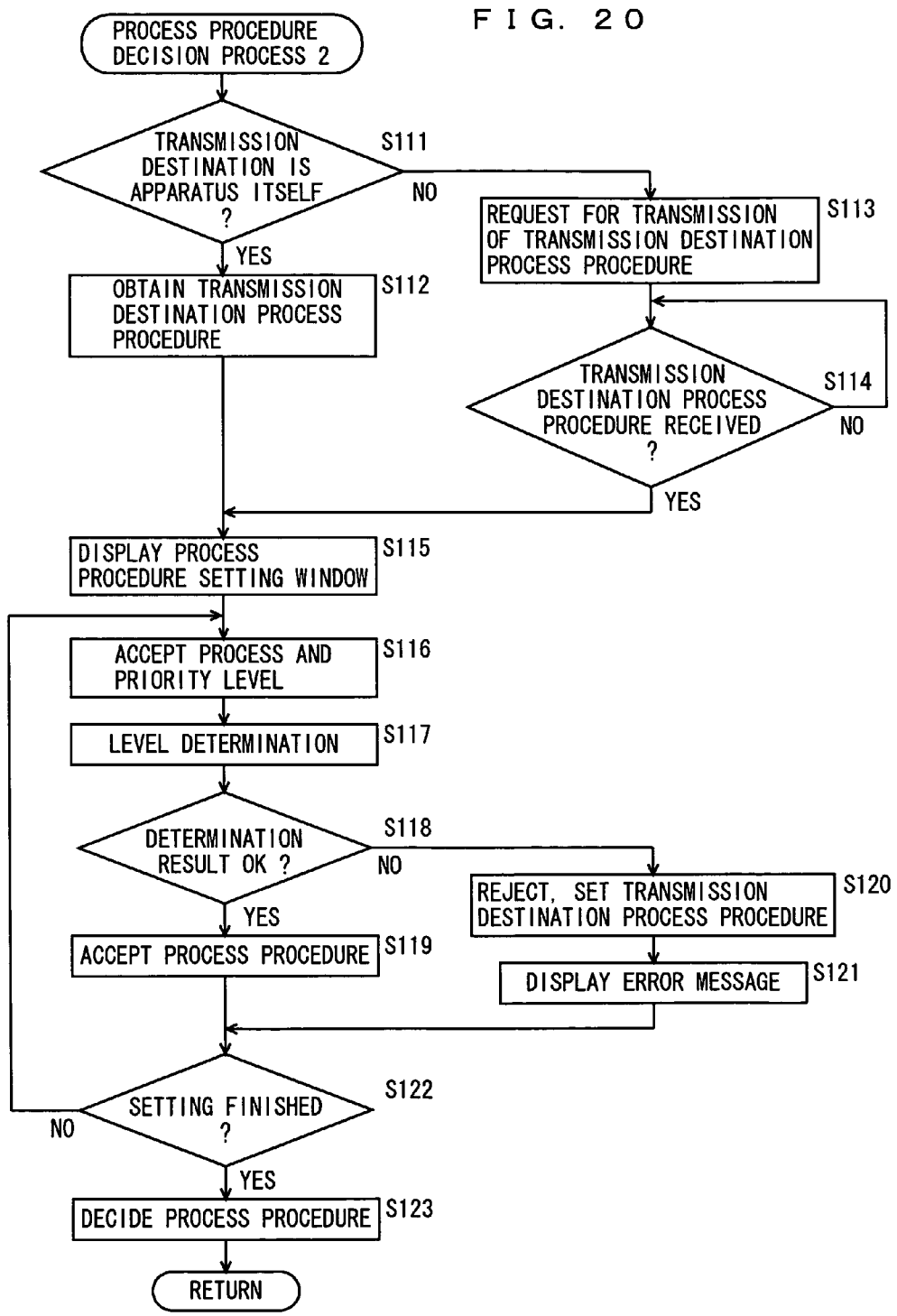
FIG. 20 is another diagram illustrating a flow of a process procedure decision process.

FIG. 20 is another diagram showing an exemplary flow of a process procedure decision process. This process procedure decision process is a process executed in step S28A of FIG. 19. Referring to FIG. 20, MFP 100 serving as a job input terminal determines whether or not the transmission destination is itself or not (step S111). Specifically, if the registered user information including the user identification information designated as a destination in step S26 of FIG. 19 is stored in HDD 107, it is determined that the transmission destination is MFP 100 itself. If the transmission destination is MFP 100 itself, the process proceeds to step S112. If not, the process proceeds to step S113.

In step S112, the registered user information including the user identification information designated as a destination in step S26 of FIG. 19 is read from HDD 107, and a transmission destination process procedure included in the read registered user information is obtained. On the other hand, in step S113, the home terminal for the user specified by the user identification information designated as a destination is requested to transmit a transmission destination process procedure. Specifically, a home terminal is specified based on the user data including the user identification information designated as a destination, and a signal requesting transmission of a transmission destination process procedure is transmitted to home terminal MFP 100A. The signal requesting transmission of a transmission destination process procedure includes user identification information designated as a destination. In the next step S114, the stand-by state continues until a transmission destination process procedure is received from home terminal MFP 100A (NO in step S114), and when a transmission destination process procedure is received, the process proceeds to step S115.

In step S115, a process procedure setting window is displayed on display portion 119B. Then, a process and a priority level are accepted (step S116). Then, it is determined whether or not the accepted process is acceptable according to the priority level (step S117). As a result of determination, if it is acceptable, the process proceeds to step S119 (YES in step S118), and if it is unacceptable, the process proceeds to step S120 (NO in step S118). Specifically, the priority level for the accepted process is compared with the priority level for the corresponding process defined by the transmission destination process procedure, and if the priority level for the accepted process is higher than the priority level for the corresponding process defined by the transmission destination process procedure, it is determined to be acceptable. On the other hand, if the priority level for the accepted process is the same as the priority level for the corresponding process defined by the transmission destination process procedure, whether acceptable or not is determined according to a predetermined rule.

The relationship between a prescribed rule and acceptability is as follows.

(1) For the security-related printing process, a process with heavier security has a higher priority, and for the normal printing process, a transmission destination process procedure has a higher priority. According to this rule, when the accepted process is a security-related printing process, it is determined to be acceptable if the security is heavy, and it is determined to be unacceptable if the security is not heavy. When the accepted process is a normal printing process, it is determined to be unacceptable.

(2) For the security-related printing process, a process with heavier security has a higher priority, and for the normal printing process, a transmission source process procedure has a higher priority. According to this rule, when the accepted process is a security-related printing process, it is determined to be acceptable if the security is heavy, and it is determined to be unacceptable if the security is not heavy. When the accepted process is a normal printing process, it is determined to be unacceptable.

(3) For all the processes, a transmission destination process procedure has a higher priority. According to this rule, all of the accepted processes are determined to be unacceptable.

(4) For all the processes, a transmission source process procedure has a higher priority. According to this rule, all of the accepted processes are determined to be acceptable.

(5) For a particular process, a transmission destination process procedure has a higher priority, and for the other processes, a transmission source process procedure has a higher priority. According to this rule, if the accepted process is a particular process, it is determined to be unacceptable, and if it is any other process, it is determined to be acceptable.

(5) For a particular process, a transmission source process procedure has a higher priority, and for the other processes, a transmission destination process procedure has a higher priority. According to this rule, if the accepted process is a particular process, it is determined to be unacceptable, and if it is any other process, it is determined to be acceptable.

In step S119, the accepted process is accepted as a transmission source process procedure, and the process then proceeds to step S122. On the other hand, in step S120, the accepted process is rejected, and the process corresponding to the accepted process which is defined by the transmission destination process procedure is set as a transmission source process procedure. Then, an error message appears on display portion 119B to notify the user of being unacceptable.

In the next step S122, it is determined whether or not the setting of a transmission source process procedure is finished. If it is determined that the setting is finished, the process proceeds to step S123. If not, the process goes back to step S116. It is determined that the setting is finished by detecting a press on the button included in input portion 119A to give an instruction to finish the setting. In step S123, the accepted process procedure is decided as a transmission source process procedure, and the process then ends.

FIG. 21 is a diagram showing a specific example of a transmission destination process procedure. Referring to FIG. 21, the priority level for the setting item of monochrome printing is set at Level 1, the priority level for the setting item of double-sided printing is set at Level 2, the priority level for the setting item of data saving after printing is set at Level 1, the priority level for the setting item of transfer (mail) is set at Level 2, and the priority levels for the other setting items are set as "no designation."

FIG. 22 is a first diagram showing exemplary priority levels that can be set according to a prescribed rule. FIG. 22 exemplarily shows that a rule is defined such that a transmission source process procedure is given higher priority for a process of the setting item of double-sided printing and single-sided printing, and that a transmission destination process procedure is given higher priority for the other processes. For the setting item of color printing and the setting item of monochrome printing, the priority level can be set only with "no designation." This is because the priority level for the setting item of monochrome printing is set at Level 1 in the transmission destination process procedure. For the setting item of double-sided printing and the setting item of single-sided printing, the priority level can be set to any of "no designation", Level 1, and Level 2. This is because the priority level of the setting item of double-sided printing is set at Level 2 in the transmission destination process procedure. For the setting item of data deletion after printing and the setting item of data saving after printing, the priority level can only be set with "no designation." This is because the priority level for the setting item of data saving after printing is set at Level 1 in the transmission destination process procedure. For the setting item of transfer (mail) and the setting item of transfer prohibited (mail), the priority level can be set to either "no designation" or Level 1. This is because the priority level for the setting item of transfer (mail) is set at Level 2 in the transmission destination process procedure.

FIG. 23 is a second diagram showing exemplary priority levels that can be set according to a prescribed rule. FIG. 23 exemplarily shows that a rule is defined such that a transmission destination process procedure is given higher priority for the processes of the setting items of color printing and monochrome printing, and that a transmission source process procedure is given higher priority for the other processes. For the setting item of color printing and the setting item of monochrome printing, the priority level can be set only with "no designation." This is because the priority level for the setting item of monochrome printing is set at Level 1 in the transmission destination process procedure. For the setting item of double-sided printing and the setting item of single-sided printing, the priority level can be set to any of "no designation", Level 1, and Level 2. This is because the priority level for the setting item of double-sided printing is set at Level 2 in the transmission destination process procedure. For the setting item of data deletion after printing and the setting item of data saving after printing, the priority level can be set to either "no designation" or Level 1. This is because the priority level for the setting item of data saving after printing is set at Level 1 in the transmission destination process procedure. For the setting item of transfer (mail) and the setting item of transfer prohibited (mail), the priority level can be set to any of "no designation", Level 1, and Level 2. This is because the priority level for the setting item of transfer (mail) is set at Level 2 in the transmission destination process procedure.

FIG. 24 is a third diagram showing exemplary priority levels that can be set according to a prescribed rule. FIG. 24 exemplarily shows that a rule is defined such that for the security-related printing process, a process with heavier security is given higher priority, and that for the normal printing process, a transmission destination process procedure is given higher priority. For the setting item of color printing and the setting item of monochrome printing, the priority level can be set only with "no designation." This is because the priority level for the setting item of monochrome printing is set at Level 1 in the transmission destination process procedure. For the setting item of double-sided printing and the setting item of single-sided printing, the priority level can be set to either "no designation" or Level 1. This is because the priority level for the setting item of double-sided printing is set at Level 2 in the transmission destination process procedure. For the setting item of data deletion after printing, the priority level can be set to either "no designation" or Level 1. For the setting item of data saving after printing, the priority level is set at "no designation." This is because the priority level for the setting item of data saving after printing is set at Level 1 in the transmission destination process procedure. For the setting item of transfer (mail), the priority level can be set to either "no designation" or Level 1. For the setting item of transfer prohibited (mail), the priority level can be set to any of "no designation", Level 1, and Level 2. This is because the priority level for the setting item of transfer (mail) is set at Level 2 in the transmission destination process procedure.

Figure 25:
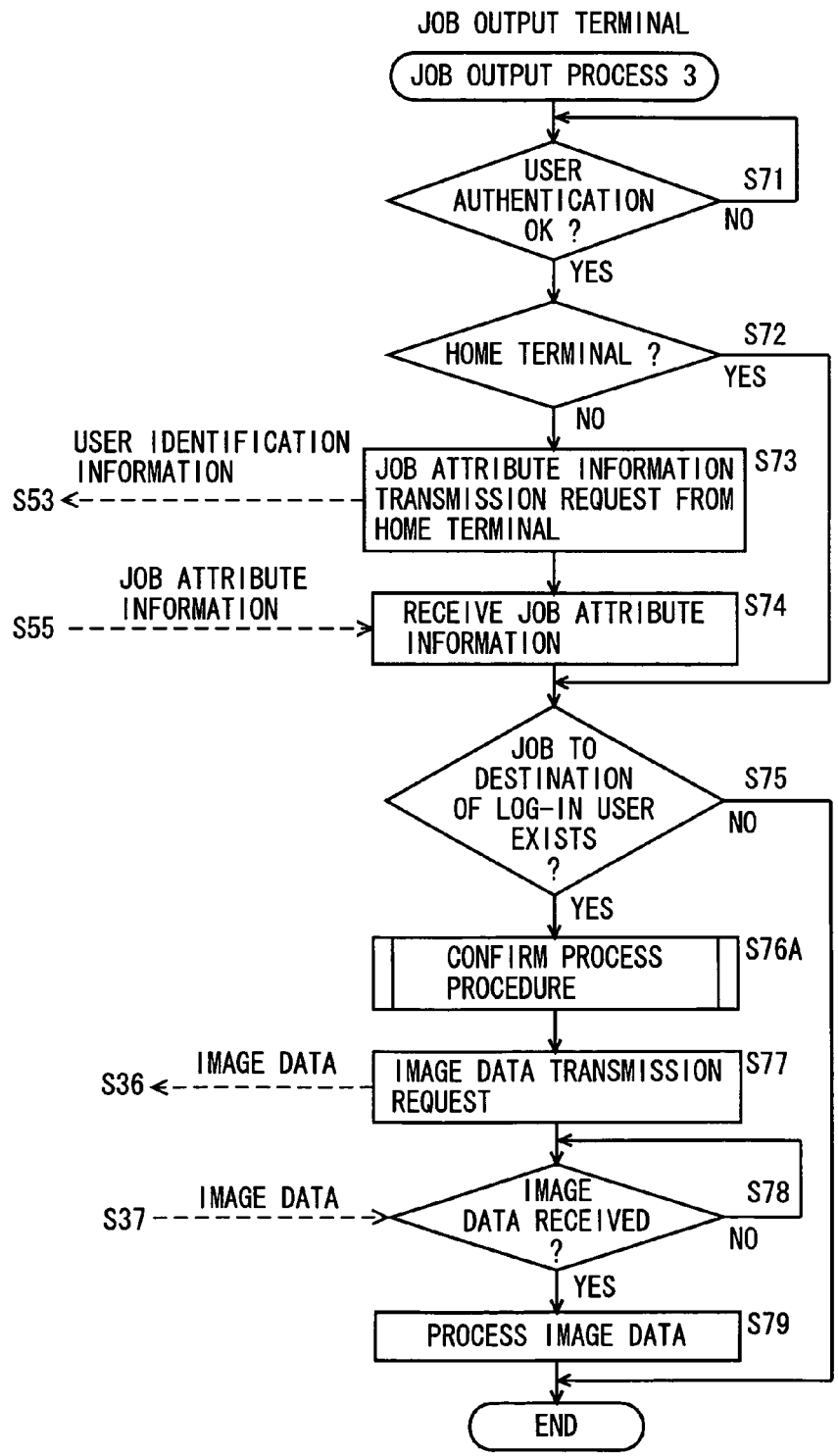
FIG. 25 is a third flowchart illustrating an exemplary flow of a job output process performed at a job output terminal.

FIG. 25 is a third flowchart illustrating an exemplary flow of a job output process executed at a job output terminal. Referring to FIG. 25, this job output process differs from that shown in FIG. 11 in that step S76 is modified to step S76A. In step S76A, a process procedure confirmation process is executed.

Figure 26:
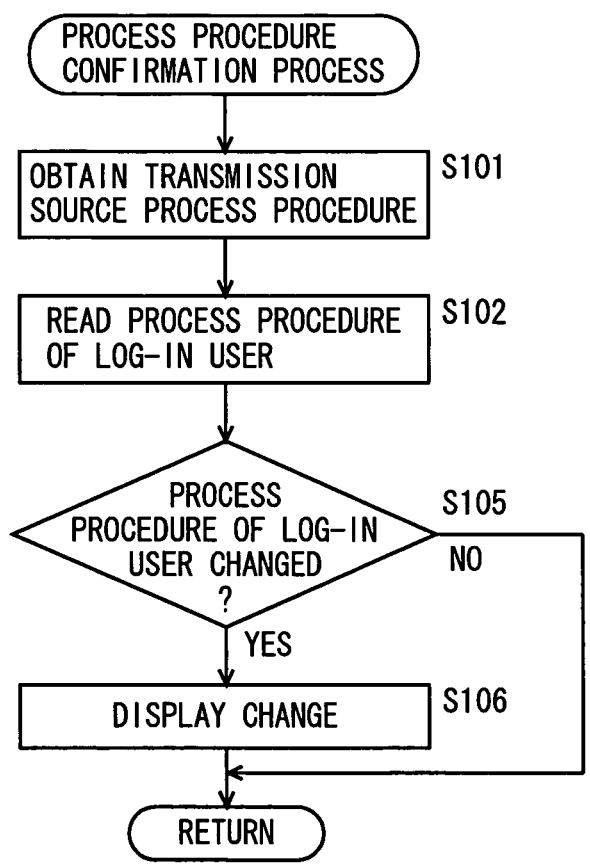
FIG. 26 is a flowchart illustrating an exemplary flow of a process procedure confirmation process.

FIG. 26 is a flowchart illustrating an exemplary flow of a process procedure confirmation process. Referring to FIG. 26, step S101, step S102, step S105, and step S106 are the same processes as in the process procedure decision process shown in FIG. 13. Therefore, the description will not be repeated here.

Figure 27:
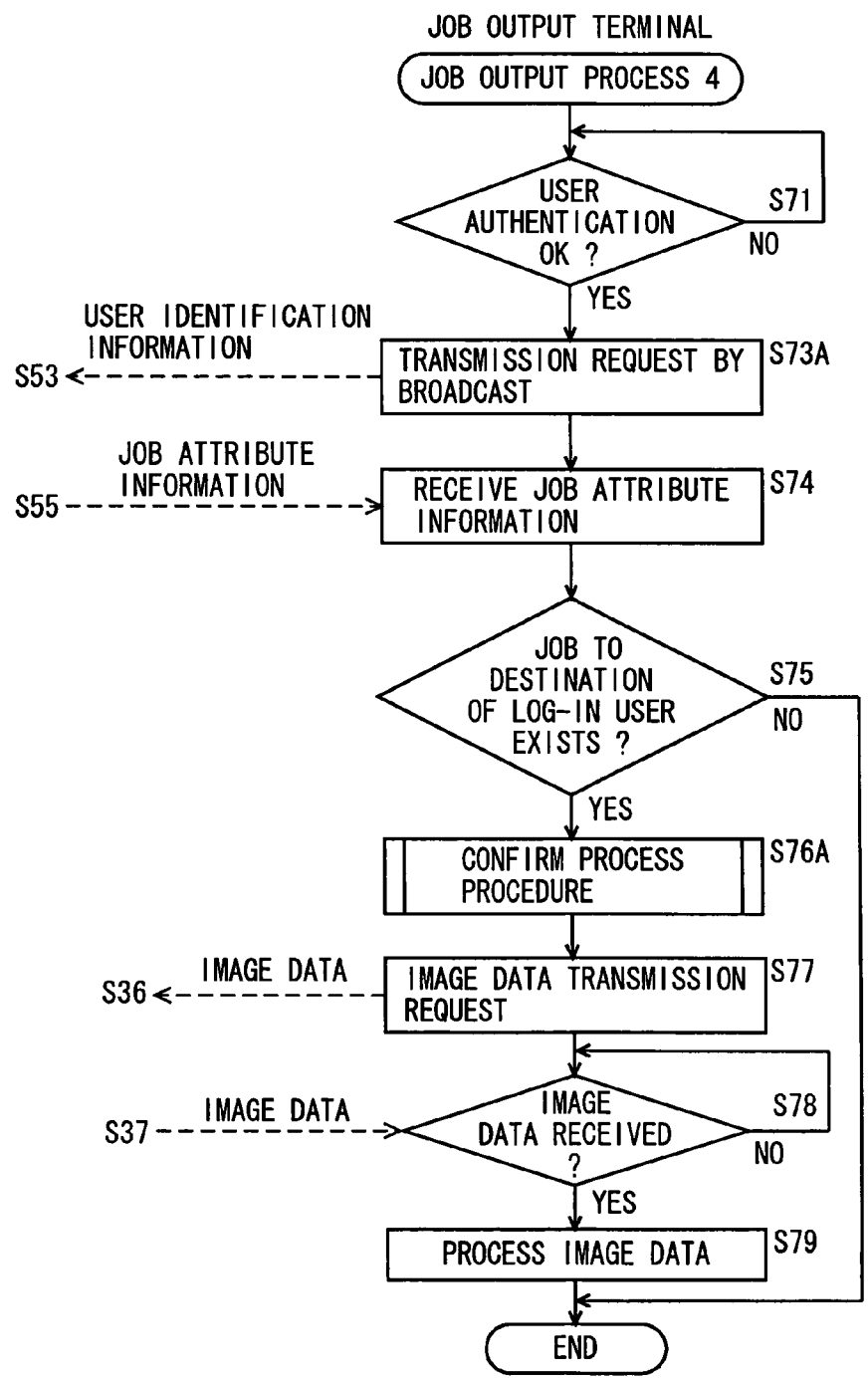
FIG. 27 is a fourth flowchart illustrating a flow of a job output process performed at a job output terminal.

Also in data processing system 1 in the second embodiment, the modified BOX transmission is applicable similarly to data processing system 1 in the first embodiment. However, the job output process shown in FIG. 18 is partially different. FIG. 27 is a fourth flowchart illustrating a flow of a job output process executed at a terminal other than the output terminal. Referring to FIG. 27, this job output process differs from that shown in FIG. 18 in that step S76 is modified to step S76A. In step S76A, the process procedure confirmation process shown in FIG. 26 is executed.

As described above, the data processing system in the second embodiment is configured with MFPs 100, 100A, 100B, 100C each connected to a network. At the time of inputting image data, a job input terminal, for example, MFP 100 receives image data at scanner 113, FAX 117 or communication I/F 111 and receives user identification information of a destination, so that CPU 101 obtains a transmission destination process procedure related to the user identification information of the destination from the home terminal specified by the user identification information of the destination, which is here MFP 100A, and accepts a transmission source process procedure with reference to the obtained transmission destination process procedure. When a process that is contradictory to the transmission destination process procedure is accepted, the accepted process is set as a transmission source process procedure if the priority level is high. Furthermore, when the process that is contradictory to the transmission destination process procedure is a security-related process, the setting of the priority level equal to the priority level set for the process of the transmission destination process procedure is accepted, on condition that the security is heavier than that of the process defined in the transmission destination process procedure, and the accepted process is then set as a transmission source process procedure. On the other hand, when the process that is contradictory to the transmission destination process procedure is a predetermined process, the setting of the priority level equal to the priority level set for the process of the transmission destination process procedure is accepted, and the accepted process is then set as a transmission source process procedure. Therefore, even if the processes set at the sending side and the receiving side are mutually contradictory, either process can be decided on.

Then, job attribute information is generated in which information of a location of image data on the network, user identification information and a transmission source process procedure are related to one another. The image data is stored in HDD 107 of MFP 100 as a job input terminal, and in addition, the job attribute information is transmitted to the home terminal, which is here MFP 100A, of the user specified by the user identification information of the destination for storage.

When the destination user logs in the job output terminal, which is here MFP 100B, the job attribute information including the user identification information allocated to that user is obtained from the home terminal, which is here MFP 100B. Then, image data specified by the image data information is processed according to the transmission source process procedure included in the job attribute information. Therefore, a process procedure can be set at each of the sending side and the receiving side. In addition, when a transmission destination process procedure of the log-in user is different from the transmission source process procedure, the different process is displayed on display portion 119B, so that the log-in user can be aware that a process different from the transmission destination process procedure set by himself is executed.

In the present embodiment, image data is stored in a job input terminal. However, image data may be transmitted to the home terminal of the destination user together with job attribute information to allow the image data and the job attribute information to be stored in the home terminal.

It is noted that although the data processing system as described above is configured with MFPs 100, 100A, 100B, 100C, by way of example, a personal computer may be connected to network 2 so that the personal computer executes the same process as executed in MFPs 100, 100A, 100B, 100C. In such a case, the process executed at job input terminal MFP 100 as described above is executed at the personal computer side. Also in this case, data can be obtained with MFPs 100, 100A, 100B, 100C set as a job output terminal.

Alternatively, a server may be connected to network 2 so that user data is stored only in the server. In this case, user data is downloaded from the server, or user data stored in the server is referred to in each of MFPs 100, 100A, 100B, 100C every time user data is required.

Furthermore, it is needless to say that although in the embodiments described above, data processing system 1 has been described, the present invention can be understood as a data transmission and reception method and a data processing program executed by each of MFPs 100, 100A, 100B, 100C included in data processing system 1.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A data processing system comprising a plurality of image processing apparatuses, comprising:
    a first image processing apparatus, at a transmission source, among said plurality of image processing apparatuses includes:
    a user data storing portion to store user data including at least user identification information for identifying a user,
    a destination designation portion to accept designation of the user identification information included in said user data as a destination of data,
    a data designation portion to accept designation of data to be delivered to the destination designated by said destination designation portion,
    a transmission source process procedure accepting portion to accept a transmission source process procedure which defines a plurality of printing process settings to be executed on data designated by said data designation portion, and
    a related data generation portion to generate related data in which said designated user identification information, said designated data, and said accepted transmission source process procedure are related to one another; and
    a second image processing apparatus, at a transmission destination, among said plurality of image processing apparatuses includes:
    a user identification information input portion to accept an input of user identification information,
    a transmission destination process procedure obtaining portion to obtain a transmission destination process procedure which is registered beforehand corresponding to said input user identification information and defines a plurality of printing processes to be executed on data,
    a data obtaining portion to obtain data related to said input user identification information by said related data,
    a process procedure decision portion to compare a priority level of the plurality of printing process settings defined in the transmission source process procedure received from the first image processing apparatus with the plurality of printing processes defined in the transmission destination process procedure, and to decide between a process defined by the transmission source process procedure and a process defined by the transmission destination process procedure to define a final process procedure based on the comparison, and
    a processing execution portion to process said obtained data according to said final process procedure decided by said process procedure decision portion.

2. The data processing system according to claim 1, wherein
    said transmission source process procedure accepting portion includes a level setting portion to set a level for at least one of a plurality of processes included in said transmission source process procedure, and for processes contradictory between said transmission source process procedure and said transmission destination process procedure, said process procedure decision portion includes a level selecting portion to decide on a process with a higher level as a final process procedure between a process defined by said transmission source process procedure and a process defined by said transmission destination process procedure.

3. The data processing system according to claim 2, wherein when the processes contradictory between said transmission source process procedure and said transmission destination process procedure have a same level, said process procedure decision portion includes a selection portion to select any one of said contradictory processes according to a predetermined rule.

4. The data processing system according to claim 3, wherein said selection portion includes a transmission source selecting portion to select a process included in said transmission source process procedure.

5. The data processing system according to claim 4, wherein when said contradictory processes are security-related processes, said transmission source selecting portion includes a security selecting portion to select a process with a heavier security.

6. The data processing system according to claim 4, wherein when said contradictory processes are predetermined transmission destination priority processes, said transmission source selecting portion includes a transmission destination selecting portion to select a process included in said transmission destination process procedure.

7. The data processing system according to claim 3, wherein said selection portion includes a transmission destination selecting portion to select a process included in said transmission destination process procedure.

8. The data processing system according to claim 7, wherein when said contradictory processes are security-related processes, said transmission destination selecting portion further includes a security selecting portion to select a process with a heavier security.

9. The data processing system according to claim 7, when said contradictory processes are predetermined transmission source priority processes, said transmission destination selecting portion includes a transmission source selecting portion to select a process included in said transmission source process procedure.

10. The data processing system according to claim 1, wherein said related data generation portion generates related data which is further related to user identification information for identifying a user of a transmission source, and
    when said transmission source process procedure is changed by said process procedure decision portion, the data processing system further comprises a transmission source notification portion to give notification of a changed process to a predetermined transmission destination corresponding to the user identification information related to said extracted data.

11. The data processing system according to claim 1, when said transmission destination process procedure is changed by said process procedure decision portion, further comprising a transmission destination notification portion to give notification of a changed process to a predetermined transmission destination corresponding to the user identification information designated as said destination.

12. The data processing system according to claim 1, wherein said data obtaining portion includes a related data obtaining portion to obtain related data including said input user identification information.

13. A data processing system comprising a plurality of image processing apparatuses, comprising:
- a first image processing apparatus, at a transmission source, among said plurality of image processing apparatuses includes:
- a user data storing portion to store user data including at least user identification information for identifying a user,
- a destination designation portion to accept designation of the user identification information included in said user data as a destination of data,
- a data designation portion to accept designation of data to be delivered to the destination designated by said destination designation portion,
- a transmission destination process procedure obtaining portion to obtain a transmission destination process procedure which is registered beforehand corresponding to the user identification information designated by said destination designation portion and defines a plurality of printing processes to be executed on data,
- a transmission source process procedure accepting portion to accept a transmission source process procedure which defines a plurality of printing process settings to be executed on data designated by said data designation portion, with reference to said obtained transmission destination process procedure,
- a related data generation portion to generate related data in which said designated user identification information, said designated data, and said accepted transmission source process procedure are related to one another; and
- a second image processing apparatus, at a transmission destination, among said plurality of image processing apparatuses includes:
- a user identification information input portion to accept an input of user identification information,
- a data obtaining portion to obtain data related to said input user identification information by said related data,
- a process procedure decision portion to compare priority level of the plurality of printing process settings defined in the transmission source process procedure received from the first image processing apparatus with the plurality of printing processes defined in the transmission destination process procedure, and to decide between a process defined by the transmission source process procedure and a process defined by the transmission destination process procedure to define a final process procedure based on the comparison; and
- a processing execution portion to process said obtained data according to the final process procedure related to said obtained data by said related data.

14. The data processing system according to claim 13, wherein, for a process contradictory to the transmission destination process procedure, said transmission source process procedure accepting portion includes a level accepting portion to accept a level which is set at least at a level set for a process of said transmission destination process procedure.

15. The data processing system according to claim 14, wherein when said contradictory process is a security-related process, said level accepting portion includes a first equal level accepting portion to accept a setting of a level equal to a level set for a process of said transmission destination process procedure, on condition that security is heavier than the process defined in said transmission destination process procedure.

16. The data processing system according to claim 14, wherein when said contradictory process is a predetermined process, said level accepting portion includes a second equal level accepting portion to accept a setting of a level equal to a level set for a process of said transmission destination process procedure.

17. The data processing system according to claim 13, when said transmission destination process procedure is changed by said process procedure decision portion, further comprising a transmission destination notification portion to give notification of a changed process to a predetermined transmission destination corresponding to the user identification information designated as said destination.

18. The data processing system according to claim 13, wherein said data obtaining portion includes a related data obtaining portion to obtain related data including said input user identification information.

19. A data processing method comprising the steps of:
- in a first image processing apparatus, at a transmission source;
- storing user data including at least user identification information for identifying a user,
- accepting designation of the user identification information included in said user data as a destination of data,
- accepting designation of data to be delivered to said designated destination,
- accepting a transmission source process procedure which defines a plurality of printing process settings to be executed on said designated data, and
- generating related data in which said designated user identification information, said designated data, and said accepted transmission source process procedure are related to one another; and
- in a second image processing apparatus, at a transmission destination;
- accepting an input of user identification information,
- obtaining a transmission destination process procedure which is registered beforehand corresponding to said input user identification information and defines a plurality of printing processes to be executed on data,
- extracting data related to said input user identification information by said related data;
- comparing a priority level of the plurality of printing process settings defined in the transmission source process procedure received from the first image processing apparatus with the plurality of printing processes defined in the transmission destination process procedure,
- deciding between a process defined by the transmission source process procedure and a process defined by the transmission destination process procedure to define a final process procedure based on the comparison, and
- processing said extracted data according to said decided final process procedure.

20. A data processing method comprising the steps of:
- in a first image processing apparatus, at a transmission source;
- storing user data including at least user identification information for identifying a user;
- accepting designation of the user identification information included in said user data as a destination of data,
- accepting designation of data to be delivered to said designated destination;
- obtaining a transmission destination process procedure which is registered beforehand corresponding to said designated user identification information and defines a plurality of printing processes to be executed on data,
- accepting a transmission source process procedure which defines a plurality of printing process settings to be executed on said designated data, with reference to said obtained transmission destination process procedure, generating related data in which said designated user identification information, said designated data, and said accepted transmission source process procedure are related to one another; and in a second image processing apparatus, at a transmission destination;

accepting an input of user identification information, obtaining data related to said input user identification information by said related data, comparing a priority level of the plurality of printing process settings defined in the transmission source process procedure received from the first image processing apparatus with the plurality of printing processes defined in the transmission destination process procedure, deciding between a process defined by the transmission source process procedure and a process defined by the transmission destination process procedure to define a final process procedure based on the comparison, and processing said obtained data according to the final process procedure related to said obtained data by said related data.

21. A data processing program product, stored on a non-transitory computer readable storage medium, and configured to cause a computer to execute the steps of:

in a first image processing apparatus, at a transmission source;

storing user data including at least user identification information for identifying a user, accepting designation of the user identification information included in said user data as a destination of data, accepting designation of data to be delivered to said designated destination, accepting a transmission source process procedure which defines a plurality of printing process settings to be executed on said designated data, generating related data in which said designated user identification information, said designated data, and said accepted transmission source process procedure are related to one another; and in a second image processing apparatus, at a transmission destination;

accepting an input of user identification information, obtaining a transmission destination process procedure which is registered beforehand corresponding to said input user identification information and defines a plurality of printing processes to be executed on data, extracting data related to said input user identification information by said related data;

comparing a priority level of the plurality of printing process settings defined in the transmission source process procedure received from the first image processing apparatus with the plurality of printing processes defined in the transmission destination process procedure, deciding between a process defined by the transmission source process procedure and a process defined by the transmission destination process procedure to define a final process procedure based on the comparison, and processing said extracted data according to said decided final process procedure.

22. A data processing program product, stored on a non-transitory computer readable storage medium, and configured to cause a computer to execute the steps of:

in a first image processing apparatus, at a transmission source;

storing user data including at least user identification information for identifying a user, accepting designation of the user identification information included in said user data as a destination of data, accepting designation of data to be delivered to said designated destination, obtaining a transmission destination process procedure which is registered beforehand corresponding to said designated user identification information and defines a plurality of printing processes to be executed on data, accepting a transmission source process procedure which defines a plurality of printing process settings to be executed on said designated data, with reference to said obtained transmission destination process procedure, generating related data in which said designated user identification information, said designated data, and said accepted transmission source process procedure are related to one another; and in a second image processing apparatus, at a transmission destination;

accepting an input of user identification information, obtaining data related to said input user identification information by said related data, comparing a priority level of the plurality of printing process settings defined in the transmission source process procedure received from the first image processing apparatus with the plurality of printing processes defined in the transmission destination process procedure, deciding between a process defined by the transmission source process procedure and a process defined by the transmission destination process procedure to define a final process procedure based on the comparison, and processing said obtained data according to the final process procedure related to said obtained data by said related data.

* * * * *